United States Patent [19]

Bernkopf

[11] Patent Number: 5,353,133

[45] Date of Patent: Oct. 4, 1994

[54] A DISPLAY HAVING A STANDARD OR REVERSED SCHIEREN MICROPROJECTOR AT EACH PICTURE ELEMENT

[75] Inventor: Jan Bernkopf, Gibsonia, Pa.

[73] Assignee: Magnascreen Corporation, Pittsburgh, Pa.

[21] Appl. No.: 182,684

[22] Filed: Jan. 18, 1994

Related U.S. Application Data

[63] Continuation of Ser. No. 797,060, Nov. 25, 1991, abandoned.

[51] Int. Cl.$^5$ ................. G02F 1/1335; G02F 1/13; F21V 7/04; F16C 29/02
[52] U.S. Cl. ................................ 359/41; 359/42; 359/51; 359/67; 362/32; 385/31; 385/901
[58] Field of Search .................. 385/31, 121, 901; 359/41, 42, 51, 67, 445, 619; 362/32

[56] References Cited

U.S. PATENT DOCUMENTS

| | | | |
|---|---|---|---|
| 3,821,588 | 6/1974 | Przybylek | 313/220 |
| 3,836,243 | 9/1974 | Melchoir | 359/41 |
| 3,840,695 | 10/1974 | Fischer | 359/50 |
| 3,861,783 | 1/1975 | Dill et al. | 359/54 |
| 3,897,997 | 8/1975 | Kalt | 359/230 |
| 3,989,357 | 11/1975 | Kalt | 359/231 |
| 4,006,383 | 2/1977 | Luo et al. | 315/51 |
| 4,042,854 | 8/1977 | Luo et al. | 315/51 |
| 4,090,219 | 5/1978 | Ernstoff et al. | 359/85 |
| 4,105,294 | 8/1978 | Peck | 359/230 |
| 4,114,070 | 9/1978 | Asars | 315/169.2 |
| 4,135,959 | 1/1979 | Luo et al. | 156/230 |
| 4,156,833 | 5/1979 | Wey et al. | 340/719 |
| 4,266,339 | 5/1981 | Kalt | 29/829 |
| 4,336,536 | 6/1982 | Kalt et al. | 340/783 |

(List continued on next page.)

FOREIGN PATENT DOCUMENTS

| | | |
|---|---|---|
| 0035382 | 9/1981 | European Pat. Off. . |
| 0179913 | 5/1986 | European Pat. Off. . |
| 0206178 | 12/1986 | European Pat. Off. . |
| 62-14624 | 1/1987 | Japan .............. 359/42 |

(List continued on next page.)

OTHER PUBLICATIONS

Nakagawa et al., "A New High-Resolution Jumbotron", SID 86 Digest (1986); pp. 246–249.

Myodo et al., "A Large Screen Color Display Using an Array of LCD Modules" Japan Display '83 pp. 430–432.

Brody et al., "A 6×6 Inch 20-Lines-per-Inch Liquid Crystal Display Panel" Brody et al., IEEE Transactions on Electron Devices, vol. 20, No. 11 (Nov. 1973) pp. 995–1001.

Luo et al. "Alphanumeric and Video Performance of a 6×6 30 Liner Per Inch Thin Film Transistor–Liquid Crystal Display Panel" Proceedings of the S.I.D. vol. 19, No. 2 (1978) pp. 63–67.

(List continued on next page.)

Primary Examiner—Anita P. Gross
Assistant Examiner—Ron Trice
Attorney, Agent, or Firm—Davis Hoxie Faithfull & Hapgood

[57] ABSTRACT

A flat-panel display system and a display method utilizing microprojection techniques whereby each pixel of the display acts as its own micro-projector. The microprojector utilizes a reversed Schieren optical arrangement. A flat fiber-optic illuminator and an illumination method provide collimated light for the display. A layer of light scattering material such as polymer dispersed liquid crystal (PDLC) is interposed between the illuminator and the rear-projection screen of the display. The scattering layer, when in a first state, allows the collimated light to pass through openings in an aperture plate that is part of the microprojection display. In a second state, the scattering layer scatters the collimated light. Side and vertical walls of the aperture plate absorb most of the scattered light resulting in a high contrast ratio for the display. The degree of scattering can be controlled to provide for a gray scale for the display. One manner of control is the use of active matrix components on a substrate of the display.

43 Claims, 15 Drawing Sheets

U.S. PATENT DOCUMENTS

| | | | |
|---|---|---|---|
| 4,408,836 | 10/1983 | Kikuno | 359/53 |
| 4,435,047 | 3/1984 | Fergason | 359/52 |
| 4,688,900 | 8/1987 | Doane et al. | 359/98 |
| 4,693,557 | 9/1987 | Fergason | 359/51 |
| 4,716,403 | 12/1987 | Morozumi | 340/702 |
| 4,716,507 | 12/1987 | Ames | 385/121 |
| 4,735,495 | 4/1988 | Henkes | 359/42 |
| 4,745,485 | 5/1988 | Iwasaki | 358/236 |
| 4,856,863 | 8/1989 | Sampsell et al. | 385/4 |
| 4,886,343 | 12/1989 | Johnson | 359/53 |
| 4,980,774 | 12/1990 | Brody | 358/241 |
| 5,022,750 | 6/1991 | Flasck | 359/51 |
| 5,247,600 | 9/1993 | Williams et al. | 385/901 |

FOREIGN PATENT DOCUMENTS

| | | | |
|---|---|---|---|
| 289025 | 3/1990 | Japan | 359/41 |
| 3-45924 | 2/1991 | Japan | 359/62 |
| 8800715 | 1/1988 | World Int. Prop. O. | |

OTHER PUBLICATIONS

"What is GRIN Lens?", Application Notes, *Selfoc Product Guide*, NSG America, Inc. (Feb. 19, 1991), p. 3.

ORIEL Gradient Index Lenses, Data Sheet, pp. 1–30, 1–31.

S. E. Shields and W. P. Bleha, "Light Valve and Projection LCD's", *Liquid Crystals Application and Uses*, World Scientific, (1990), pp. 457–460, 466–467, 469–470.

B. Bahadur, "Dynamics Scattering Mode LCD's" *Liquid Crystals Application and Uses*, World Scientific, (1990), pp. 196–199.

J. W. Doane, "Polymer Dispersed Liquid Crystal Display", *Liquid Crystals Application and Uses*, World Scientific, (1990) pp. 362–363.

S. E. Shields and W. P. Bleha, "Light Valve and Projection Mode LCD's", *Liquid Crystals Application and Uses*, World Scientific, (1990) pp. 446–449.

Hans-U Lauer, et al., "A Frame-Sequential Color-TV Projection Display", *SID 90 Digest*, (1990), pp. 534–537.

Richard J. Felix and Kenneth M. Dunbrow, "Toward a Multiflex Video Display", *Lasers & Optronics*, (May 1991), pp. 55–58, 60, 62.

"What is Pitch", Application Notes, Sefloc Product Guide NSG America, Inc. (Feb. 19, 1991), p. 4.

*Fiber Optics Handbook*, McGraw-Hill (1990), pp. 3.28–3.30.

S. E. Shields and W. P. Bleha, "Light Valve and Projection LCD's", *Liquid Crystals Application and Uses*, World Scientific, (1990), pp. 457–460, 466–467, 469–470.

A DISPLAY HAVING A STANDARD OR REVERSED SCHIEREN MICROPROJECTOR AT EACH PICTURE ELEMENT

This invention was made with United States Government support under contract number MDA973-90-C-0032 awarded by the Defense Advanced Research Projects Agency. The United States Government has certain rights in the invention.

This is a continuation of copending patent application Ser. No. 07/797,060 filed Nov. 25, 1991, now abandoned.

FIELD OF THE INVENTION

The present invention relates to a flat-panel display system and a method of displaying information thereon whereby each picture element in the display system acts as its own projector. The present invention also relates to a flat fiber-optic illuminator and a method of illumination that may be utilized, for example, as the light source for a flat-panel display system.

BACKGROUND OF THE INVENTION

Recently, flat-panel displays have achieved increasing acceptance in the marketplace, particularly with regard to small, hand-held television sets and portable computers. These displays are quite thin compared to cathode ray tubes, yet are able to display video and other information. Various attempts have also been made to develop large flat-panel displays as replacements for conventional cathode ray tube display systems, particularly in situations where a great deal of information must be processed and displayed, such as in proposed high definition television (HDTV) systems.

Although the primary use of flat-panel displays are for television and computer displays, flat-panel displays can be used in any number of different applications, such as for highway signs, office building directories, graphics presentations, and in avionics.

An example of a flat-panel display is shown in Brody U.S. Pat. No. 4,980,774, issued Dec. 25, 1990, and assigned to the assignee of the present application. The Brody '774 patent describes a modular flat-screen, direct-view display system that utilizes diffuse light for backlighting, where the displayed image is uninterrupted by the boundaries between modules.

Currently, a number of different materials and techniques are utilized in emissive and non-emissive flat-panel displays. For example, some flat-panel displays use liquid crystals as the display medium, while others use a gas-discharge plasma or electroluminescent material.

Recently, polymer dispersed liquid crystal (PDLC) material has been applied to flat-panel display systems. A useful form of PDLC material for display applications is a thin layer (typically 20 $\mu$m thick) of a polymer in which micron-sized liquid crystal droplets are embedded. The thin layer of PDLC material is usually sandwiched between two sheets of glass having conductive coatings facing the PDLC layer. These conductive coatings act as electrodes to apply an electric field to the PDLC material. Depending on the applied field, the PDLC material either scatters the light incident to it or is transparent. Also, the degree of scattering can be electrically controlled.

In the relaxed (non-energized) state, the birefringent nematic droplets of the PDLC layer strongly scatter light because the random orientation of the liquid crystal droplets causes a mismatch between the refractive indices of the droplets and the surrounding polymer binder. In the energized state, when applied voltage on the electrodes creates an electric field, the liquid crystal molecules of the PDLC material align themselves with the electric field. In this condition, the refractive indices between the droplets and the surrounding polymer are nearly matched for light entering the PDLC layer perpendicularly. Therefore, light entering the PDLC layer perpendicularly passes through the layer virtually undisturbed. Upon removal of the voltage, the liquid crystal droplets return to their original random orientation. The voltage applied to the electrodes can be varied in order to adjust the degree of scattering of the droplets.

Another important feature of PDLC material is that the liquid crystal droplets are encapsulated in a polymer that acts like a solid. Therefore, the display medium may be brought out to the very edge of individual display modules, thus permitting minimal spacing between individual picture elements or pixels of adjacent modules and allowing for an almost seamless appearance to the entire display. In this regard, see, Brody U.S. Pat. No. 4,980,774.

There are various well known ways of controlling particular picture elements in a display such that each picture element is in an "off" or an "on" state. One way is direct addressing where each picture element is directly connected to the driver electronics for 100% of the time. An example of direct addressing is a segmented display, such as in some LCD watches, where each segment of the alphanumeric character (for example, the top horizontal member in the number "5") is an independent electrode. However, as the amount of information that must be displayed increases, a greater number of electrical connections must be used in a segmented display, thus rendering such displays impractical.

Another means for addressing the electrodes is the use of matrix techniques. In matrixing schemes, a particular picture element or pixel is activated by the driver electronics for only a fraction of the time. However, each picture element has sufficient "memory" and/or is "refreshed" often enough such that there is no discontinuity in the viewed display.

In the context of a flat-panel display, there are two matrixing techniques that are commonly used, namely, multiplexing and active matrix. A multiplexed display consists of two substrates having transparent conductive stripes at right angles to one another. The area defined by the overlap of the conductive stripes represents individual picture elements or pixels of the display. A layer of liquid crystal or other appropriate display medium is located between the electrodes. As is well known in the art, the timing and relative amplitudes of the electrical signals applied to the conductive stripes allow for different voltages to be applied to different pixels in the display, thus resulting in some pixels being "on" and others being "off". However, as the number of vertical or horizontal lines on a display increase, the number of conductive stripes on the appropriate substrate must be increased. This reduces the time available to address each individual pixel, resulting in a decrease in the contrast that can be achieved between "on" and "off" pixels. A practical upper limit for such displays is in the order of a few hundreds of lines (stripes).

In active-matrix displays, each picture element or pixel on the display contains a thin film transistor (TFT) or other electronic switch that sets the state of that pixel when voltage on a data line is allowed to pass onto the pixel electrode. By this technique the brightness of each picture element of a display can be independently controlled. See, for example, U.S. Pat. Nos. 3,840,695 (Fisher) and 4,980,774 (Brody).

One particular type of a flat-panel display is a direct-view, backlit flat-panel display. This kind of display modulates light emanating from an area source of diffuse light. This source of diffuse light is usually very shallow, for example, a fluorescent lamp or a plurality of fluorescent lamps, resulting in a shallow depth for the entire display.

Twisted nematic liquid crystals, addressed either by multiplexing or active-matrix techniques, are commonly employed as the element for modulating the light in direct-view flat-panel display systems. The light from the diffuse light source is modulated by the liquid crystal material in combination with polarizing elements and reaches the viewer directly without the need for any additional optical elements or a projection screen—thus the reference to such a system as a "direct-view" system.

The performance of these direct-view displays has been steadily improving through advances in the chemistry of liquid crystals and addressing techniques. However, the maximum viewing area of active-matrix, direct-view displays is limited by the size of available active-matrix substrates. A technique for making a large active-matrix direct-view display by assembling an array of display modules is described in Brody U.S. Pat. No. 4,980,774. The necessity to conceal the seams between modules in such a direct-view system (in order to create a seamless image) makes it difficult to use standard liquid crystal materials that require a seal at the periphery of each module. Instead, PDLC material is used in place of a standard liquid crystal material since PDLC material can be brought to the very edge of each module without the need for a seal.

The inherent disadvantage of using PDLC material as the light modulating medium in a direct-view display stems from the fact that a diffuse light source is modulated by a scattering medium. For example in the case of an ideal source of diffuse light (Lambertian surface) adjacent to an ideal scattering medium, there is no intensity modulation, in other words, the contrast ratio is 1:1. (The contrast ratio is the ratio of the light intensity for a particular pixel of the display in an "on" condition compared to the light intensity for that pixel in the "off" condition.) The scattering medium redistributes the light rays, but does not affect the intensity of the light reaching the viewer.

To produce an acceptable contrast ratio with PDLC material in a direct-view display device, a dichroic dye is incorporated in the liquid crystal droplets of the PDLC material. The elongated molecules of the dye align themselves with the molecules of the liquid crystal. In the energized state, most of the incident light passes through the PDLC layer in a straight line and is attenuated only by the dyed liquid crystal droplets encountered along this single direct path. In addition, the aligned dye molecules present a smaller "cross-section" for those rays that are essentially oriented in a perpendicular fashion. In effect, the dye slightly reduces the transmittance of the PDLC layer.

In the scattering state, the light rays undergo several refractions inside the PDLC layer before they exit either in a forward or backward direction. Since the liquid crystal droplets are randomly oriented, the "cross-section" of the dye molecules is (on the average) higher, and significant attenuation of the transmitted light results.

In practice, the highest achievable contrast ratio for a direct-view display using a dyed PDLC layer is limited by the requirement for an acceptable value of transmittance. Further, any electronics mounted in the display between the light source and the display surface may cast a shadow. Techniques employed to suppress or eliminate the shadowing further limit the achievable transmittance of the display system.

An alternative to a direct-view system is a projection system where the information (image) is illuminated with a bright light source and is projected through a lens or system of lenses onto a screen. This lens or system of lenses is known as the "objective". During the projection process, the image is magnified, depending upon the image size desired. The image can be projected on a screen that is in front of the projector and the viewer whereby the image is reflected back to the viewer. This is referred to as front projection. Alternatively, the screen can be placed between the viewer and the projector, whereby the screen is illuminated with the projected image from behind. The image is then scattered forward towards the viewer. This is called rear projection.

One commonly known use of a rear-projection device is projection TV. The images, which are formed on a faceplate of one or more specially designed CRT's, are projected onto the rear-projection screen from within the CRT enclosure, while the viewer is observing the images in front of the TV set on the rear projection screen. This technique has recently been demonstrated for displaying high density, high resolution images in HDTV systems.

The major advantage of projection displays is the ease with which a large area display can be achieved. High quality images several feet in diagonal are commonly projected by commercially available products. However, the physical depth of such a projector is determined by the required optical path, which is also typically several feet. Even if the optical path is folded by the use of mirrors, it still results in a rather bulky and heavy device.

A variation of a projection system utilizes what is called a light valve. A light valve is a thin device that can control (modulate) the intensity of light passing perpendicularly through it in accordance with a signal applied to the components that control the light valve. When a light valve is inserted into the path of projected light, images formed on the light valve surface are projected with the desired magnification toward a screen. A small twisted nematic liquid crystal display (LCD) has recently been utilized as the light valve of a front-projection commercial television system made by Sharp Corporation.

A special category within the family of LCD based projection systems is the light valve technique utilizing the phenomenon of light scattering. The modulation of the light is achieved by scattering some of the light into a much wider solid angle than the solid angle subtended by the input aperture of the objective lens. Thus, by varying the degree of scattering, the intensity of light reaching the viewer is controlled. A projection optical system based on scattering in this manner is a type of what is referred to as a Schlieren optical system. (Although other techniques, such as light diffraction or refraction, have been employed in Schlieren optical systems, for purposes of convenience and clarity in this application, only the scattering phenomenon in Schlieren optical systems is discussed herein.)

In a standard Schlieren optical system, when the light valve is in its non-scattering state, the light passes through the light valve without disturbance and is then obstructed by an opaque stop, known as a Schlieren stop. No light reaches the screen. When a voltage, or some other control means, is applied to the light valve, the light valve scatters the light and the scattered light bypasses the stop and is then collected by a projection lens and imaged on a screen.

A Schlieren optical system can be rearranged into what I call a reversed Schlieren optical system such that 1) light reaches the screen when the light valve is in its non-scattering state, and 2) light is mostly absorbed by some structure when the light valve is in its scattering state.

Although the use of standard Schlieren optical systems and reversed Schlieren optical systems have been known for some time, the only projection systems known to the applicant that have been made using the Schlieren concept have projected images several feet away to achieve the required size of the projected image.

One embodiment of the microprojection, flat-panel display system apparatus and method of the present invention is designed to rearrange the optics of reversed Schlieren-type projectors so as to result in a large flat-panel display that overcomes many of the problems of existing flat-panel systems. An alternate embodiment of the apparatus and method of the present invention utilizes a standard Schlieren-type arrangement.

In order to obtain optimum performance of the microprojection display system of the present invention, a thin illuminator that produces collimated light is desirable. Existing commercially available illuminators that produce collimated light generally have considerable depth relative to the overall desired thickness of the display system. Therefore, the present invention is also directed to a thin fiber-optic illuminator of minimal depth that can produce collimated light. The illuminator of the present invention, although primarily intended for use with non-emissive, flat-panel display systems, can also be used in any application where large-area collimated radiation is required.

Further, with regard to existing direct-view, flat-panel display systems, there remains a need for improved thin illuminators that provide an area source of diffuse light. Certain variations of the thin fiber-optic illuminator of the present invention can be used to produce such diffuse light.

SUMMARY OF THE INVENTION

It is an object of this invention to provide a rear-projection display system and display method based on light valve technology and having a depth of only a few inches.

It is a further object of the invention to provide a modular flat-panel display system that has the following characteristics:
high contrast ratio;
high luminance;
concealed inter-modular joints;
choice of a variety of different color filter components;
choice of a variety of color filter component placement within the display structure; and
absence of parallax problems.

It is a further object of the present invention to provide a thin fiber-optic illuminator and a method of illumination that can produce an area source of collimated light.

It is a further object of the present invention to provide a thin fiber-optic illuminator that can produce an area source of diffuse light.

It is a further object of this invention to produce a flat-panel display using projection techniques where the display is comparable in thickness to existing direct-view, flat-panel displays.

It is a further object of this invention to provide a complete flat-panel modular display system that combines a flat fiber-optic illuminator with a reversed Schlieren microprojection display or a standard Schlieren microprojection display.

A preferred embodiment of the display system of the present invention involves the rearrangement of the configuration of the optical elements comprising a reversed Schlieren optical projection system in such a way that the display comprises as many reversed Schlieren microprojection systems as there are picture elements or pixels. Each pixel of the display becomes its own miniature projector—hence the name microprojection. The information from each picture element may be projected on a rear projection screen. An aperture plate in the display system creates a mini reversed Schlieren optical system for each individual pixel of the display and suppresses or eliminates crosstalk between pixels. The aperture plate prevents the light that carries unwanted information (in other words, the scattered light) from reaching the viewer.

Given the miniaturization of such a display device and its compact construction, the display system of the present invention can be made quite thin, provided a thin source of collimated light is available. The thin source of collimated light, utilizing fiber optics, and method of producing collimated light, are also part of the present invention. With such a flat illuminator, the total thickness of the entire display system can be on the order of 2.0 inches.

Because a preferred embodiment of the display system of the present invention utilizes PDLC material, it lends itself to modular construction so that an extremely large display surface can be built by the seamless tiling technique as described in Brody U.S. Pat. No. 4,980,774.

DETAILED DESCRIPTION

Figure 1A:
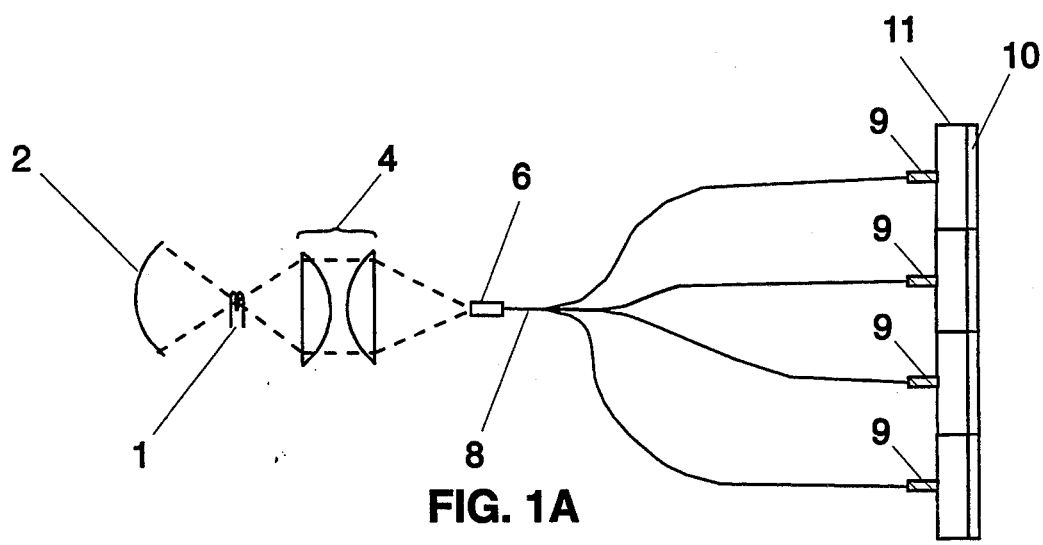
FIG. 1A is a schematic representation of a flat-panel display system of the present invention that includes modular flat fiber-optic illuminators and complete modular microprojection displays.

The microprojection display of the flat-panel display system of the present invention exploits the important advantages of constructing a large flat, active-matrix liquid crystal modular display where the displayed image is uninterrupted by the boundaries between modules, as in Brody U.S. Pat. No. 4,980,774 (which patent is incorporated fully herein by reference), together with the inherently high contrast and high achievable optical efficiency of a light-valve projection display. A preferred approach is to use the active-matrix substrate and PDLC layer as used in Brody U.S. Pat. No. 4,980,774 with a miniaturized reversed Schlieren optical system and screen placed between the PDLC layer and the viewer. By miniaturizing the reversed Schlieren optical system, each addressable pixel of the display becomes its own projector. The reversed Schlieren optical system and the screen may be constructed as an integral part of each module of the display or, preferably, they may be constructed as global components made as a single structure to be placed over the entire assembled array of display modules. This global structure may also include the color filter and a transparent cover plate to provide mechanical strength.

Parallel beams of collimated light are supplied to the rear of the display in a preferred embodiment by one of the thin fiber-optic illuminators described in detail below with reference to FIGS. 17–22 and 24–26. This allows the panel thickness to be kept small compared to that of existing direct-view displays. It is estimated that the panel thickness for the display system of the present invention can be in the range of 2 inches. The illuminators are modular and have a surface area that matches exactly that of the rear surface of each display module. Thus, the electrical connections that are brought down along the sides of each display module can continue uninterrupted along the sides of each illuminator and be brought out to the rear of the display for connection to the system drive electronics. In this way, the electronics are placed behind the light source and thereby do not cast a shadow.

Specifically, an embodiment of the display system of the present invention consists of a thin source of collimated light, and a flat-panel, reversed Schlieren optical projector. I call the latter component a microprojection display. An embodiment of the display system of the present invention is shown schematically in FIG. 1A. Light from a point source 1 is collected by the combination of a rear spherical mirror 2 and condenser lenses 4. The light is then coupled through coupling optics 6 into a non-coherent fiber optic bundle 8 to be distributed evenly through coupling optics 9 to modular illuminators 11, such as those described below in relation to FIGS. 17–22 and 24–26. Each modular illuminator 11 produces uniform parallel rays of collimated light emanating from its front face. The light is then modulated by the scattering layer in the complete microprojection display modules 10 using the miniaturized reversed Schlieren optical system as will be described below. As stated previously, other aspects of the complete microprojection display modules 10, such as the electronic driving circuitry and interconnection system, are similar to the modules described in Brody U.S. Pat. No. 4,980,774.

Figure 1B:
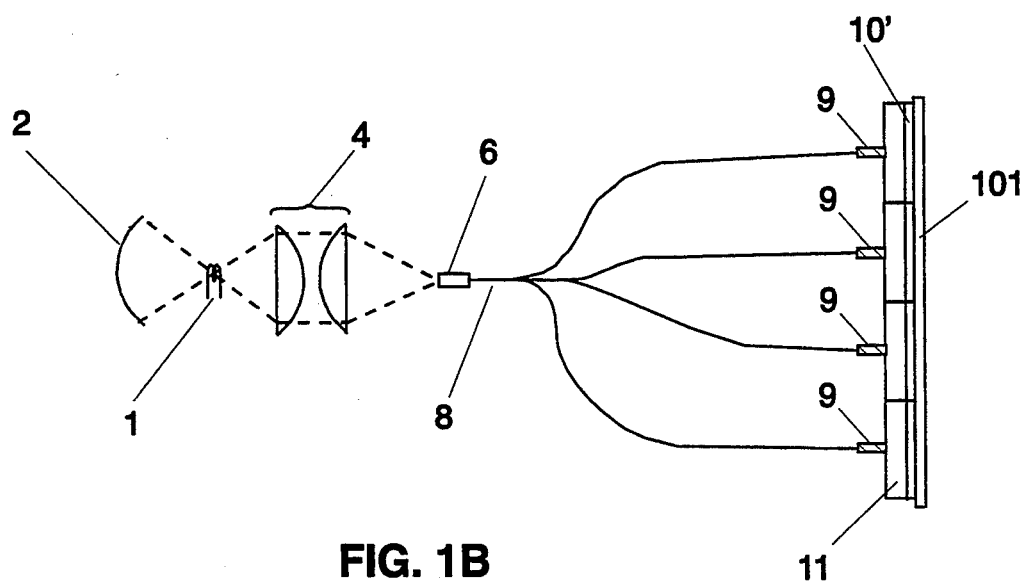
FIG. 1B is a schematic representation of an alternative flat-panel display system to the system shown in FIG. 1A wherein certain components of the display are not modularized.

FIG. 1B is a schematic diagram of an alternative embodiment of the display system of the present invention wherein certain components of the display system are not modularized but are provided as a single global structure 101 that is placed over an entire assembled array of partial display modules 10'. The partial display modules 10', shown in FIG. 2B, differ from the complete display modules 10 of FIGS. 1A and 2A in that the partial display modules 10' do not include an aperture plate which is an essential part of a reversed Schlieren optical system. The global structure 101 may include, in addition to the aperture plate, one or more of the following components: a projection screen; a color filter; a transparent cover plate.

Figure 2A:
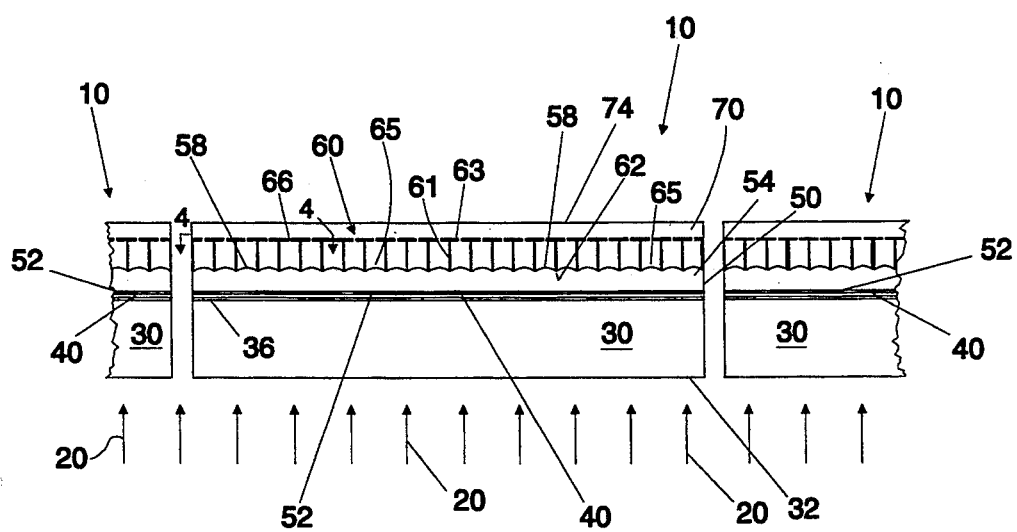
FIG. 2A is a schematic representation in section of one complete module and parts of two adjacent modules of an embodiment of the microprojection display for use in the flat-panel display system of FIG. 1A.

FIG. 2A shows an embodiment of a complete display module 10 of the microprojection display and parts of adjacent modules 10. The display is referred to as a rear-projection display due to the fact that light is projected from the back of the display module 10 (bottom of FIG. 2A), through various optical components as will be described, and then out toward the viewer through a screen 70 at the front (top) of the display module 10.

The display module 10 of FIG. 2A utilizes an area source of collimated light illustrated by the plurality of parallel light rays 20. Preferably, the parallel light rays 20 are generated in one of the thin fiber-optic illuminators described below with reference to FIGS. 17–22 and 24–26. Alternatively, the collimated light rays 20 may be generated by other collimated light sources, such as those used in overhead projectors or slide projectors. Also, it is not necessary in order to practice the invention that the light rays 20 be precisely collimated. The degree of divergence of the light rays 20 limits the achievable optical efficiency and contrast ratio of the display module 10, but does not change the principle of operation.

The rays 20 first pass through substrate 30. The substrate 30 in the preferred embodiment is made of borosilicate glass or soda lime glass. The substrate 30 may be made of high performance plastic in certain situations, particularly for multiplexed or segmented displays that are not subjected to high temperatures during the fabrication process.

Figure 11:
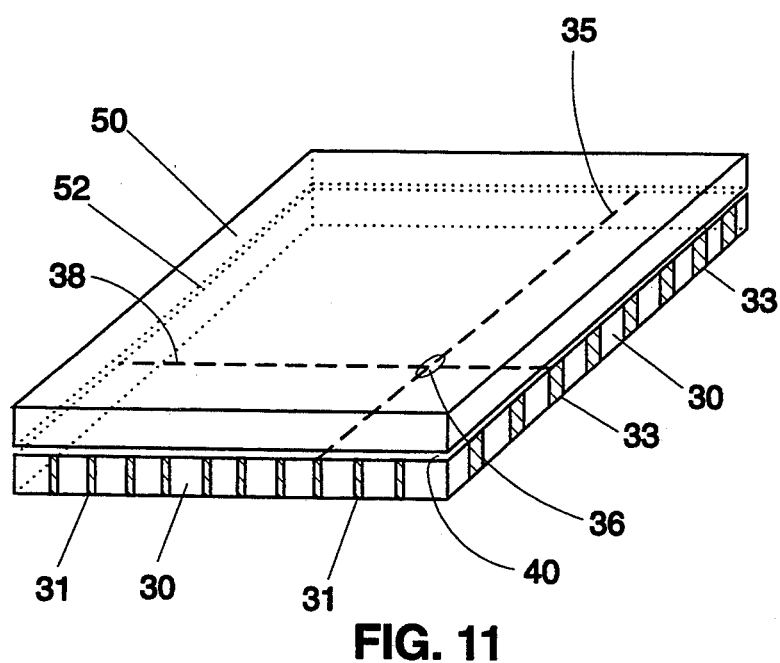
FIG. 11 is a perspective view of an active matrix addressing arrangement for a flat-panel display.
Figure 12:
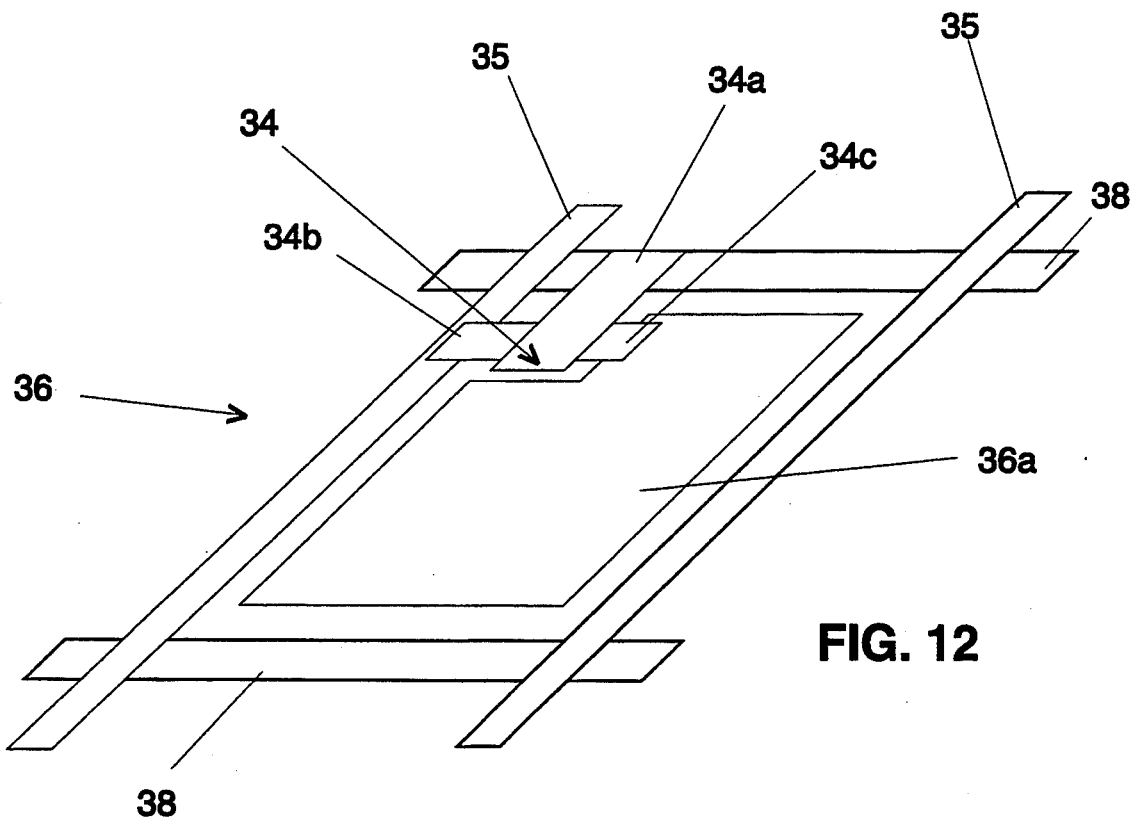
FIG. 12 is a detailed enlarged view of a portion of the FIG. 11 active matrix arrangement.
Figure 13:
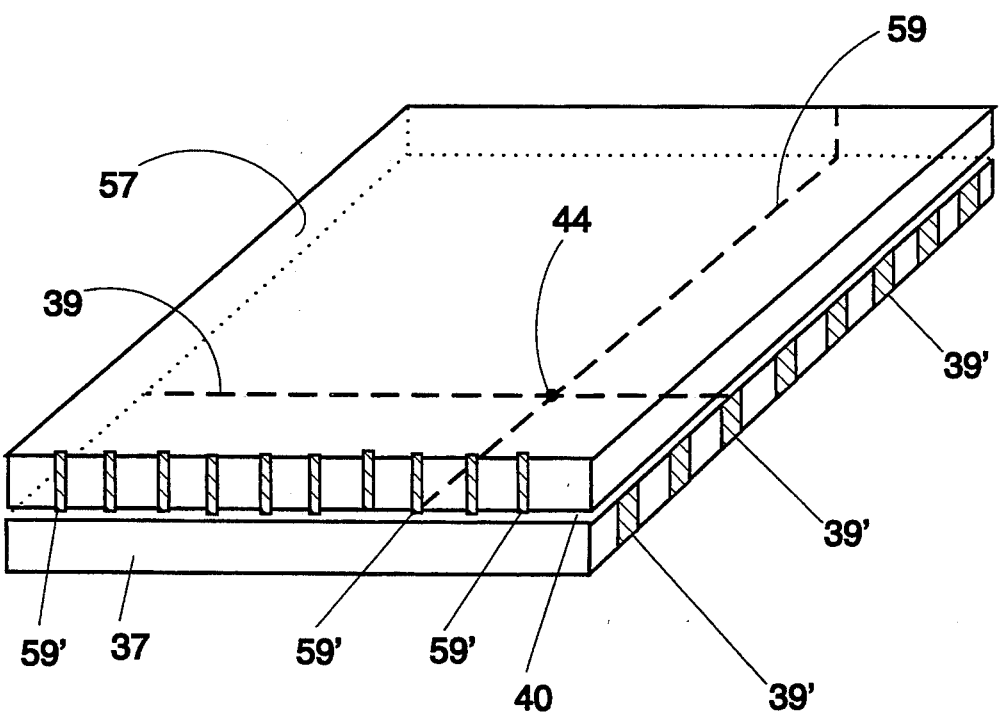
FIG. 13 is a perspective view of a multiplexed addressing arrangement for a flat-panel display.

Positioned forward of a front surface of the substrate 30 is a scattering layer 40, which, as described in more detail below, serves in conjunction with other components as the picture elements or pixels of the display module 10. In a preferred embodiment, the scattering layer 40 includes PDLC material and the substrate 30 has certain active-matrix components 36 incorporated therein, as is well known in the art, for example as shown and described in Brody U.S. Pat. No. 4,980,774, and as shown in FIGS. 11 and 12, below. However, there is no dye in the scattering layer 40. The electronic switch in the active-matrix arrangement can be one or more thin film transistors, one or more single crystal transistors, or one or more diodes or an optoelectronic device. (Capacitors may be included to provide signal storage.) Alternatively, the layer 40 and associated components may be configured as a segmented display arrangement or a multiplexed matrix arrangement, both of which are well-known in the art. A multiplexed arrangement is shown in FIG. 13.

Sandwiched around the scattering layer 40 in the FIG. 2A embodiment are the active matrix components 36 and a back plane electrode 52, which serve as the elements to control the scattering properties of the scattering layer 40. The active matrix components 36 and back plane electrode 52 are connected to suitable control electronics well known in the art, such as in the active-matrix system described in Brody U.S. Pat. No. 4,980,774, whereby control of each picture element in the display is accomplished in any desired manner.

Positioned in front of the scattering layer 40 is the cover 50 that is preferably constructed of the same glass as the substrate 30. In a preferred embodiment, the thickness of the cover 50 is approximately 40 mils. The substrate 30 also has a thickness of approximately 40 mils.

A front surface of the cover has a set of microlenses 58 molded to it. The lenses 58 can be molded from plastic, such as acrylic or polycarbonate, by conventional precision molding techniques. Also, many manufacturing techniques currently employed for binary optics are suitable for production of the microlenses 58.

Figure 4:
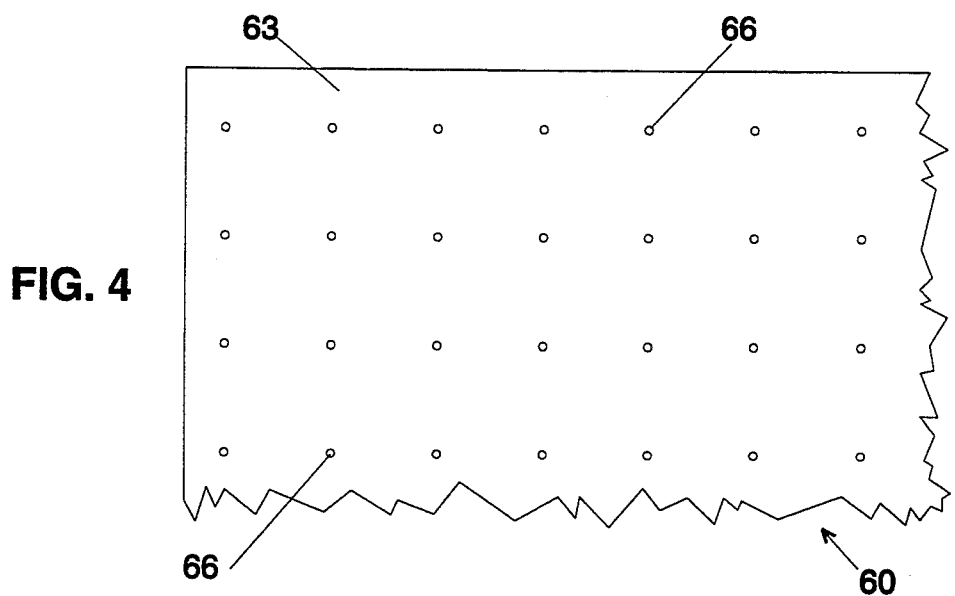
FIG. 4 is a front view of the aperture plate of FIG. 2A along lines 4—4.

In the complete display module 10 of FIG. 2A, a back surface 62 of an aperture plate 60 is secured to the microlenses 58 and thus to the front surface of the cover 50 by means of, for example, an adhesive. A rear projection screen 70 is secured on the front of the aperture plate 60 by means of optical cement or other suitable connection technique. In the FIG. 2A embodiment, there is one aperture plate 60 for each complete module 10. The aperture plate 60 for each module 10 is a one-piece honeycomb-type structure, and has a series of small cylindrical front openings 66 on its front surface. The aperture plate 60 can be viewed as having segments, where each segment corresponds to one display element or pixel of the display module 10. A front view of a portion of the aperture plate 60 of FIG. 2A is shown in FIG. 4.

There is one opening 66 in the aperture plate 60 for each microlens 58. Each opening 66 is positioned approximately at the focal point of its respective microlens 58. The side walls 61 and front walls 63 for each segment of the aperture plate 60 serve as the light absorbing element in the reversed Schlieren optical system of the microprojection display, as described below.

A preferred method for construction of the aperture plate is to mold it as a single piece of light absorbing plastic. However, any light absorbing material such as metal, glass, plastic, ceramic, graphite or even multiple layers of metal masks aligned on top of one another may be utilized to construct the aperture plate. An aperture plate that serves to absorb the scattered light and has openings at the focal points of the microlenses 58 can be manufactured by many of the micro-machining techniques currently used for producing stencil masks, CRT flat tension masks, and the like.

Rear openings 65 of the aperture plate 60, which may be cylindrical or rectangular, match up with the microlenses 58, such that the back surface 62 of the side walls 61 of the aperture plate 60 fit around the ends of each respective microlenses 58. Thus, the complete display module 10 of FIG. 1 self-aligns when constructed.

Figure 2B:
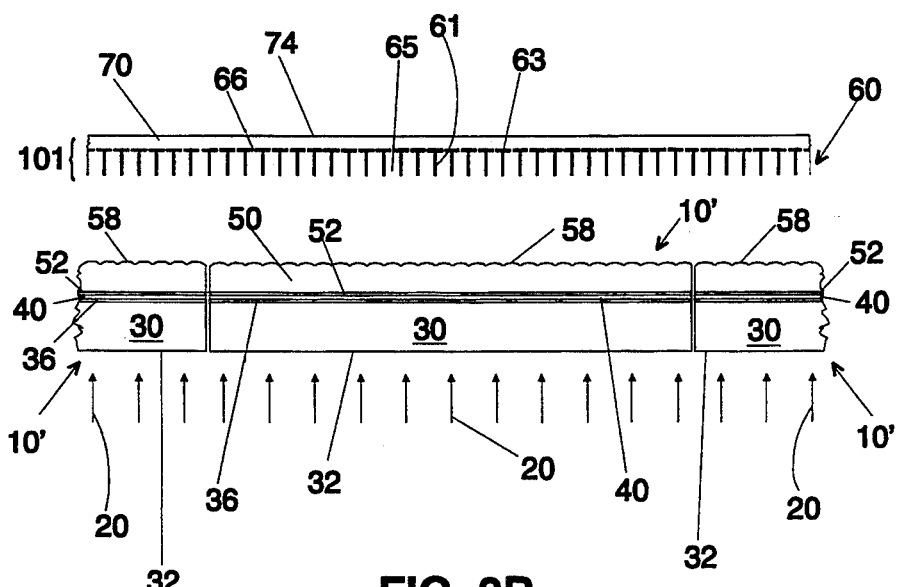
FIG. 2B is a schematic representation in section (exploded view) of display modules for use in the system of FIG. 1B, together with non-modularized components, wherein an aperture plate and a projection screen of the display are not modularized.

FIG. 2B, an exploded view, shows the aperture plate as a single one-piece structure, which overlays all of the partial display modules 10' of the entire display system. The aperture plate 60 in FIG. 2B is thus part of the global structure 101 of FIG. 1B, together with projector screen 70. However, the aperture plate can also be modular, as in FIG. 2A, where the individual modular units of the aperture plate 60 are joined together by means of self-aligning mechanical fasteners or other connection means. It will be readily seen, however, that the FIGS. 2A and 2B embodiments operate in the exact same fashion, and differ only in the use of either all modular components (FIG. 2A) or a combination of modular and global components.

The screen 70 is similar to diffusing type rear-projection screens of the type used for rear projectors. As stated above, the screen can be a single one-piece unit 70 that is part of the global structure 101, which covers all of the partial display modules 10' of the entire display (FIG. 2B), or it may itself be element 70 that is part of the complete display module 10 (FIG. 2A).

Figure 3A:
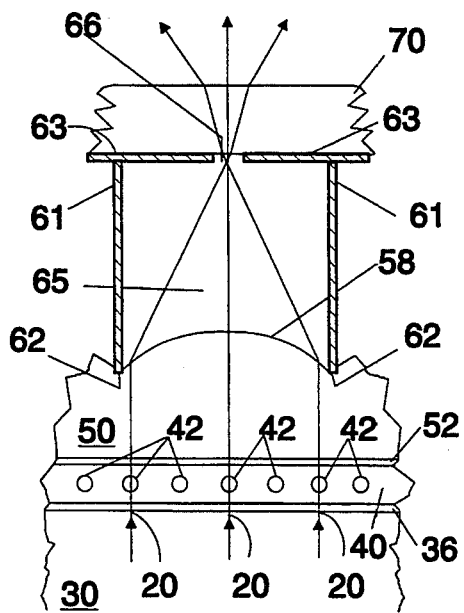
FIG. 3A is a detailed enlarged view of a small portion of an aperture plate of the reversed Schlieren microprojection display of FIGS. 2A or 2B wherein a layer of scattering material is in the "on" state and transmits incident light through an opening in a front surface of the aperture plate to the screen of the display.
Figure 3B:
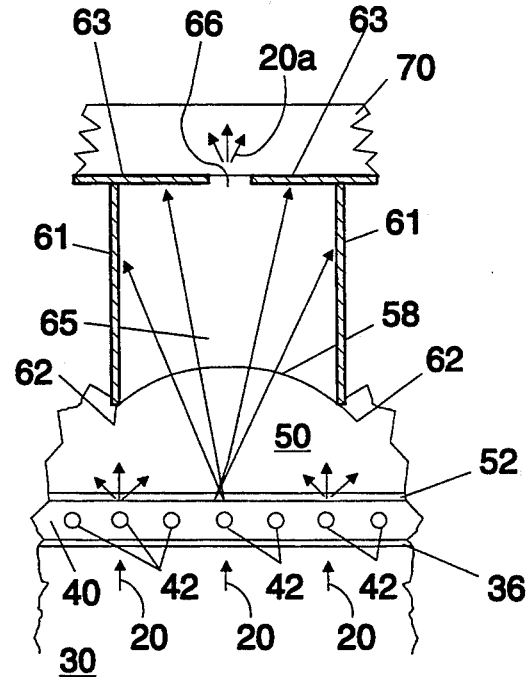
FIG. 3B is a detailed view identical to FIG. 3A except that the layer of scattering material is in the "off" state and almost all of the scattered light is absorbed in the side walls and front walls of the aperture plate.

In a preferred construction of the embodiments of FIGS. 2A and 2B, the front openings 66 in the aperture plate 60 are cylindrical and have a radius of approximately 1 mil. The back openings 65 in the aperture plate 60 are rectangular and have a diagonal dimension of approximately 11 mils, and the distance from the center of the front openings 66 to each side wall 61 is approximately 4 mils. The distance from a back surface 32 of substrate 30 to the lenses 58 is approximately 60 mils and the distance from each microlens 58 to each corresponding front opening 66 in the aperture plate 60 is approximately 40 mils. The radius of curvature of each microlens 58 is approximately 20 mils. The front openings 66 in the aperture plate 60 are centered within each segment of the aperture plate 60, as best seen in FIGS. 3A and 3B.

In general, the entire display module 10 of FIG. 2A, from the back surface 32 of the substrate 30 to a front surface 74 of the rear projection screen 70, has a depth or thickness in the range of about 0.3 inches. The depth or thickness of the display module 10 is minimized due to the configuration of the various components, as described in further details below.

The partial display module 10' of FIG. 2B, combined with the global structure 101, has similar dimensions to the complete display module 10 of FIG. 2A, when elements 10' and 101 are assembled together.

The complete display module 10 shown in FIG. 2A, and the partial display module 10' and global structure 101 shown in FIG. 2B, operate as follows. I describe below the operation of the display shown in FIG. 2A, it being understood that this explanation also applies to the FIG. 2B display.

The collimated light rays 20 pass through the substrate 30 and are incident on the scattering layer 40, as shown schematically by the individual light rays 20 in FIGS. 3A and 3B.

When the liquid crystal droplets, shown schematically as 42 in FIG. 3A, are aligned by an electrical field, the scattering layer 40 is in the transparent state and the light rays 20 pass through the scattering layer 40 substantially unaffected. The light rays 20 pass through the cover 50 and are then focused by the lenses 58 through back openings 65 in the aperture plate 60 onto front openings 66 in the aperture plate 60. Each microlens 58 is self-aligned with an opening 66 such that in the "on" condition the collimated light rays 20 are focused by microlens 58 at opening 66, as shown in FIG. 3A. The front openings 66 in the aperture plate 60 are positioned at the respective focal points of each microlens 58. The light rays 20 pass through front openings 66 in the aperture plate 60 and then toward the viewer through the rear-projection screen 70. The front openings 66 in the aperture plate 60 and microlenses 58 are aligned with the picture elements delineated, by for example, the active-matrix addressing circuitry.

When no electric field is applied to the scattering layer 40 (FIG. 3B), the liquid crystal droplets, again shown schematically as 42 in FIG. 3B, are randomly aligned and the light rays 20 are scattered isotropically. As shown schematically in FIG. 3B almost all of the light impacts the side walls 61 and front walls 63 of the aperture plate 60 and is thereby absorbed and not transmitted through opening 66 to the rear-projection screen 70. Very little of the light, represented as 20a in FIG. 3B, passes through opening 66 to the screen 70. In effect, the side walls 61 and front walls 63 of the aperture plate 60 act as the light absorbing structure in a reversed Schlieren optical system.

Although the scattering layer 40 is described above as PDLC material, any material that scatters incident light in one state and is transparent to incident light in a second state may be utilized as the scattering layer 40 in the display system of the present invention. A preferred material is PDLC. Examples of other usable materials include nematic liquid crystal operated in its dynamic scattering mode, nematic curvilinear phase liquid crystal (NCAP), and recently introduced randomly oriented liquid crystals. Also, any fluid medium containing in suspension microscopic particles responsive to an applied electric field may be used. In addition to an active-matrix construction, the display module 10 may be arranged as a multiplexed display, as is well known in the art.

Figure 3C:
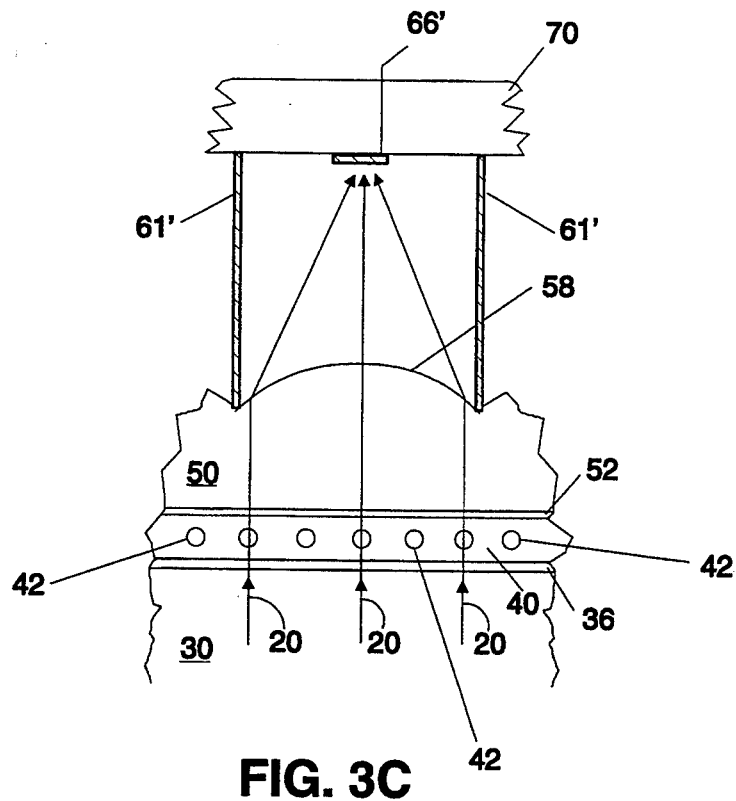
FIG. 3C is a detailed enlarged view of an alternate embodiment of the microprojection display of the present invention where a standard Schlieren optical arrangement is utilized and the layer of scattering material is in the "on" state and an optical stop blocks most of the incident light.
Figure 3D:
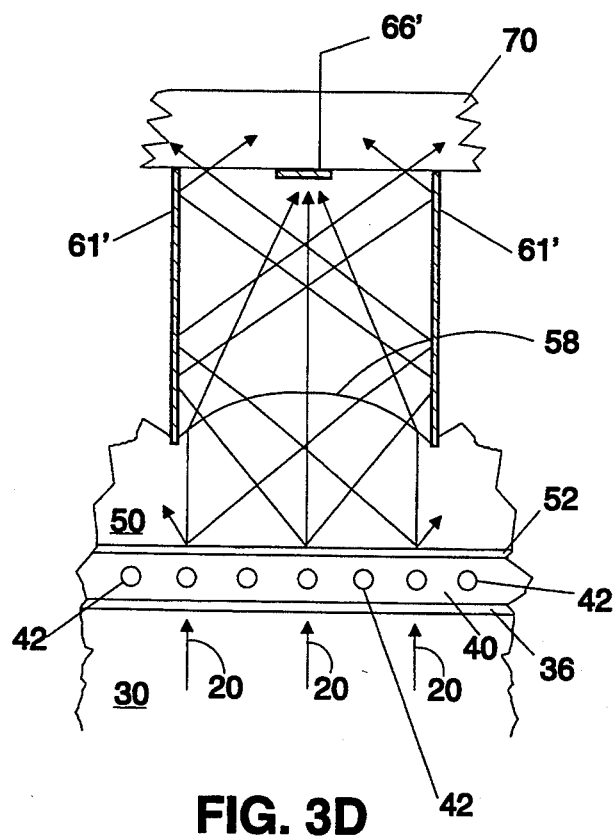
FIG. 3D is a detailed view of the alternate embodiment shown in FIG. 3C except that the layer of scattering material is in the "off" state and much of the scattered light bypasses the stop in the standard Schlieren optical arrangement.

Use of what I have characterized as standard Schlieren optical system in the microprojection display of the present invention is shown in FIGS. 3C and 3D.

In FIG. 3C, the PDLC material 40 is in the "off" condition and the non-scattered light is focused by the microlens 58 on a Schlieren stop 66'. Schlieren stop 66' is centered between reflecting walls 61' and may be made of any light absorbing material such as a black paint applied on a rear surface of the projector screen 70. Alternatively, the stop 66' may be a light absorbing plastic or the like that is adhered to the rear surface of the projector screen 70. The reflecting side walls 61' have a reflective surface such that light reflects off of the walls 61'. The overall structure of the walls 61' is like that of aperture plate 60 in prior embodiments, namely a honeycomb structure, except that there are no front walls 63 (FIGS. 3A and 3B).

When the PDLC material 40 is turned "on" as shown in FIG. 3D, the light is scattered. Much of the scattered light is reflected off of reflecting walls 61', and out to the display through the open area around the Schlieren stop 66'.

Thus, in the FIGS. 3C, 3D embodiment, the display appears dark when the PDLC material 40 is in its transparent state and appears "on" when the PDLC material is in its scattering state.

The modules 10 in FIGS. 3C, 3D can be global or modular structures, in the same manner as the FIGS. 3A, 3B embodiment.

Although described above as either transparent or scattering, scattering layer 40 can take on any intermediate state. By varying the strength of the electric field applied to the scattering layer 40, the orientation of liquid crystal droplets 42 can be changed in a smooth and continuous fashion from completely random (with no field applied) to completely aligned (with maximum field applied). In this fashion, the amount of light that reaches opening 66 can be varied from almost none to almost all of the incident light to produce a continuously variable brightness on screen 70 for each individual pixel. This is frequently referred to as a continuous gray scale display. Similarly, if other scattering media are used, the degree of scattering depends on the applied field, again permitting a gray scale display.

An active matrix arrangement, a preferred arrangement for use in the complete display module 10 and partial display module 10' of FIGS. 2A and 2B, respectively, is shown in FIGS. 11 and 12. The active matrix substrate 30 has wraparound metallization conductors 31 and 33 for connection of the data bus 35 and gate bus 38 to the electrical drive circuit of the display. (See in this regard FIG. 5 of Brody U.S. Patent No. 4,980,774 and col. 8, line 39 to col. 9, line 2 of the Brody '774 patent.) Placed on the substrate 30 are metallic data buses 35 and gate buses 38. The cover 50 with transparent backplane electrode 52 is placed over the scattering layer 40, the backplane electrode 52 being connected to fixed potential, as described below in relation to FIG. 10. The PDLC or other scattering material 40 is placed between the front surface of the substrate 30 and the backplane electrode 52.

FIG. 12 shows in detail the arrangement of one segment of the active matrix components 36 on the substrate 30, as is well known in the art. Thin film transistor 34, having a gate 34a electrically connected to the gate bus 38 and a source 34b connected to the data bus 35, forms the switching element for the active matrix arrangement. An indium tin oxide (ITO) or other similar transparent conducting electrode is placed in contact with the scattering layer 40. The transparent conducting electrode 36a is electrically charged through the drain 34c of the thin film transistor 34.

In the active matrix arrangement of FIGS. 11 and 12, the thin film transistor 34 sets the state of the display "pixel" when voltage on the data bus 35 is allowed to pass onto the transparent conductive electrode 36a for that pixel. The brightness of each picture element can be independently controlled to provide a gray scale display, as is well known in the art.

As an alternative to an active matrix arrangement, a multiplexed display arrangement such as that shown in FIG. 13 may be used. In FIG. 13, a first transparent plate or substrate 37 and a second transparent plate 57 each have transparent conductive stripes 39 and 59, respectively, disposed thereon. The conductive stripes 39 and 59 are at right angles to one another. The transparent plates 37 and 57 each have wraparound metallization conductors 39' and 59' for connection of the conductive stripes 39 and 59 respectively to the electrical drive circuitry of the display. A layer 40 of PDLC material or other scattering material is positioned between the plates 37 and 57. The areas defined by the overlap of conductive stripes 39 and 59 represent individual picture elements 44 of the display. As with the brightness control for the active matrix arrangement (FIGS. 11 and 12), the timing and relative amplitudes of the electrical signals applied to the conductive stripes 39 and 59 in a multiplexed arrangement allow for different voltages to be applied to different pixels, resulting in some pixels being in an "on" transparent state and others being in an "off" scattering state or at intermediate states to produce a gray scale.

For the FIGS. 2A and 2B embodiments of the microprojection display, the achievable contrast ratio is governed by the combination of the degree of collimation of the light source, the scattering properties of the scattering layer and the geometric parameters of the miniaturized reversed Schlieren optical system. The beneficial, practical effect of a high contrast ratio is that the user sees a significant illumination difference between those picture elements that are in the "off" (scattering) state and those picture elements that are in the "on" (transparent) state.

For a PDLC layer that is assumed to be an ideal scatterer, and which is located at distance R from spherical lenses 58 (FIG. 10), the maximum achievable contrast ratio C is given by the ratio of solid angle of $4\pi$ stearadians to the collection angle of the front opening 66 in the aperture plate 60, as follows:

$$C = \frac{4\pi(f_o + R)^2}{2\pi r^2}$$

Where $f_o$ is the distance from each microlens 58 to each front opening 66, R is the radius of curvature of each microlens 58, and r is the radius of each opening 66. These dimensions are shown on FIG. 10. It is believed that the microprojection displays of FIGS. 2A and 2B can produce a contrast ratio in the order of 1,000:1.

Figure 10:
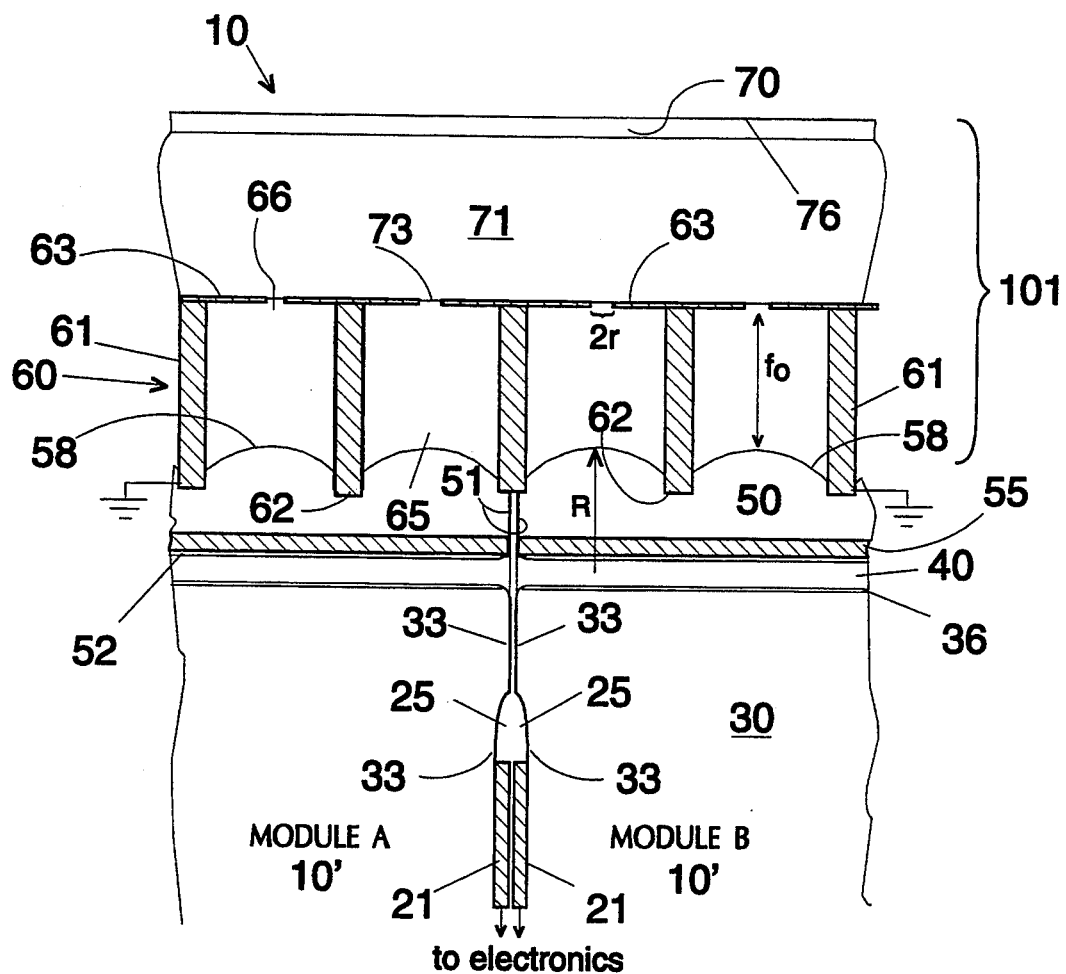
FIG. 10 is a schematic representation in section of portions of two microprojection display modules incorporated into a color modular display where the color filters for the display are positioned directly in front of the scattering layer in each module. The display of FIG. 10 also includes certain non-modular or global components, namely an aperture plate, a faceplate and a projection screen.

FIG. 10 shows two partial microprojection display modules 10' of FIG. 2B incorporated into a modular color display where a color filter 55 is placed on top of the backplane electrode 52. In FIG. 10, there is also a faceplate 71 positioned over the aperture plate 60 and behind the screen 70. The faceplate 71, preferably made of optically clear plastic, serves as a support member for other components such as the rear-projection screen 70 and, in the FIG. 2B embodiment, of the global aperture plate 60. In the embodiment depicted in FIG. 10 the global (as opposed to modular) components are the aperture plate 60, the faceplate 71 and the screen 70. These components would constitute the global structure 101 in FIG. 2B.

Display Module A in FIG. 10 is interconnected with driver circuitry in a similar manner as described in Brody U.S. Pat. No. 4,980,774 so as to result in a seamless appearance of the image between display modules. Particularly, with regard to FIG. 10, the vertical connectors 21, which are approximately 0.002 inches thick, are bonded to wraparound metal traces 33 for the gate buses 38 (FIGS. 11–12). The vertical connectors 21 are preferably placed in a recess 25 in the side wall of the substrate 30. The wraparound traces 33 connect the gate buses 38 of the active matrix components 36 on the substrate 30 to the electronics for the display system, through the vertical connectors 21. The connectors 21 continue past the sides of the modular flat illuminators 11, to be described below. As shown in FIG. 11, there are similar wraparound traces 31 for the data buses 35.

The wraparound traces 51 (shown in FIG. 10 but not in FIG. 11) connect the back plane electrode 52 to fixed potential (usually ground) through the aperture plate 60. If the aperture plate 60 is not conductive, then a conductive layer of material connected to a fixed potential can be deposited or otherwise secured to the back surface 62 of the side walls 61 of the aperture plate 60.

The most common use of rear-projection screens today is in rear-projection TV receivers. These screens use cylindrical lenses to spread the light in the horizontal plane to increase the horizontal viewing angle (with a typical gain of 5.0) at the expense of vertical viewing angle.

However the microprojection display modules 10 and 10' described herein are different from those in an existing rear-projection TV system. The light emerging from the front openings 66 in the aperture plate 60 of the micro-projector is already within a cone given by the geometry of the miniaturized reversed Schlieren optical system. Thus the microprojection display has an inherently defined viewing angle, and does not necessarily require the use of a rear-projection screen. By redesigning the shape of the microlenses 58 (and accordingly the shape of the front openings 66 in the aperture plate 60), the viewing angle pattern can be customized to suit a particular application.

At close viewing distances the use of a screen may be desirable, as each pixel appears to be a very small, but very bright, illuminated area.

Another important characteristic of rear-projection screens is their reflectivity, both specular and diffuse, of ambient light. The more ambient light reflected towards a viewer, the more degradation of contrast results. With no projection screen, the microprojection display with its black aperture plate will have minimal reflectivity. If a wide-band, anti-reflection coating is deposited on surface 73 of the faceplate 71 and surface 76 on screen 70 (FIG. 10), then almost all of the ambient light would reach the front walls 63 of the aperture plate where it would be absorbed. The rest of the light would enter through the front openings 66 formed within the aperture plate where, after reflection from the surface of the microlens 58, it would be absorbed as well by side walls 61 and front walls 63 of the aperture plate 60. It is expected that this basic configuration would perform very well in an environment with a high level of illumination such as an aircraft cockpit or any outdoor application.

If the rear-projection screen is required to spread the pixels, the rejection of ambient light will become another important factor influencing the choice of the screen. Present screens used in TV receivers do a good job of minimizing both specular and diffuse reflections. For example, a lenticular array 72, such as that shown in FIGS. 8 and 9, can be used to control the manner in which the light from the screen 70 is directed toward the viewer or viewers. This array 72 increases the brightness of the light in a particular direction, for example, toward the eye level of the average person in a seated position.

Figure 5:
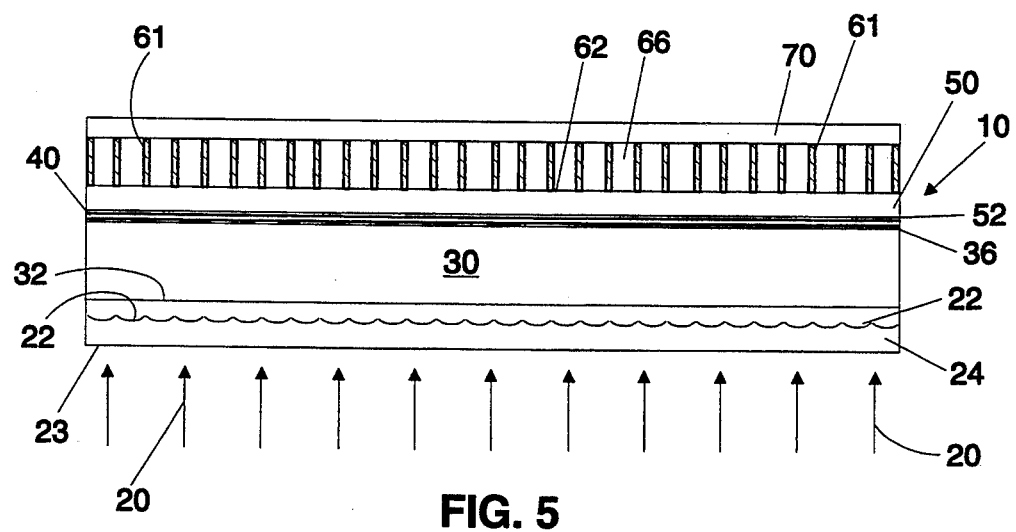
FIG. 5 is a schematic representation in section of a variation of the microprojection display module of FIG. 2A wherein a set of lenses is positioned on a back surface of a substrate of the display module.

FIG. 5 shows in schematic form a further embodiment of a rear projection flat-panel display module 10 where many of the same elements are used as in the FIGS. 2A and 2B embodiments, as indicated by the use of identical element designations.

The display module 10 of FIG. 5 is illuminated by an area source of collimated light shown schematically in FIG. 5 by a plurality of parallel light rays 20. The rays 20 pass through a set of spherical lenses 22. The lenses 22 are preferably made of molded plastic and are attached to the back surface 32 of the substrate 30. An optical transparent layer 24 having a smaller index of refraction than the spherical lenses 22 has a front surface that matches the geometric contours of the lenses 22 and a flat bottom surface 23 that can be easily attached to the front surface of an illuminator.

Positioned on the front surface of the substrate 30 is the scattering layer 40, as in the prior embodiments, together with the necessary active matrix or multiplexing display components. The cover 50 is in turn positioned forward of the scattering layer 40.

The back surfaces 62 of the side walls 61 of the aperture plate 60 are secured to the front surface of the cover 50 by means of, for example, an adhesive. The rear projection screen 70 is secured on the front surface of the aperture plate 60 by means of adhesive.

In general, the entire display module 10, from the spherical lenses 22 to the rear projection screen 70, has a depth or thickness in the range of about 0.3 inches.

The display module 10 shown in FIG. 5 operates as follows.

The collimated light rays 20 are focused by lenses 22 such that all of the light collected by each lens 22 will pass through the corresponding opening 66 of aperture plate 60. Since all of the rays pass through a small area of the scattering layer 40, none of the incident light is blocked by the bus bars and active matrix components 36 on the front surface of the substrate 30. This can result in a significant improvement in the overall optical efficiency of the display system.

The lenses 22 are spherical in configuration with a rectangular perimeter and are made of molded plastic. However, aspherical lenses and lenses made of other transparent materials may be utilized in the display module 10 of FIG. 5.

When the scattering layer 40 is in the transparent or "on" state, the light rays pass through the layer 40, through the cover 50, through front openings 66 in the aperture plate 60, and then toward the viewer through the rear projection screen 70, with little attenuation. The front openings 66 in the aperture plate 60 are aligned with the picture elements or pixels delineated in the top surface of substrate 30.

When the scattering layer 40 is in the scattering or "off" state, the light rays are scattered isotropically, and most of the light impacts the vertical side walls 61 of the aperture plate 60 and is thereby absorbed and not transmitted to the rear projection screen 70. The contrast ratio is governed by the scattering properties of the light scattering medium as well as the geometry of the aperture plate.

Figure 6:
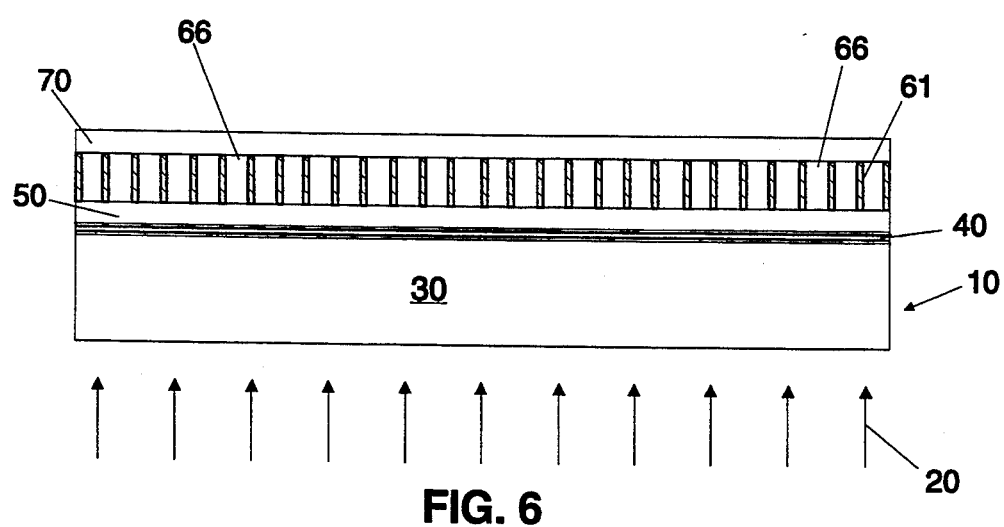
FIG. 6 is a schematic representation in section of a simplified variation of the microprojection display module of FIG. 5 wherein no lenses are utilized.

FIG. 6 shows a simplified version of the display of FIG. 5, where the various elements are identically numbered to like elements in prior figures. The display module 10 of FIG. 6 does not have any lenses for focusing the parallel light rays 20. Since the rays of collimated light are not focused in any particular manner on the front openings 66 of the aperture plate 60 (as in the FIGS. 2A and 2B embodiments), or on the picture elements defined on the front surface of substrate 30 (as in the FIG. 5 embodiment), a portion of the incident light never reaches the projection screen and the contrast ratio is not as great. An obvious advantage of the FIG. 6 embodiment is that it utilizes fewer components and is thus more compact and less expensive to manufacture than the FIGS. 2A, 2B and 5 embodiments.

It is understood that the displays shown in FIGS. 5 and 6 need not be completely modularized, but rather may also incorporate non-modular components as in the FIG. 2B embodiment.

Figure 7:
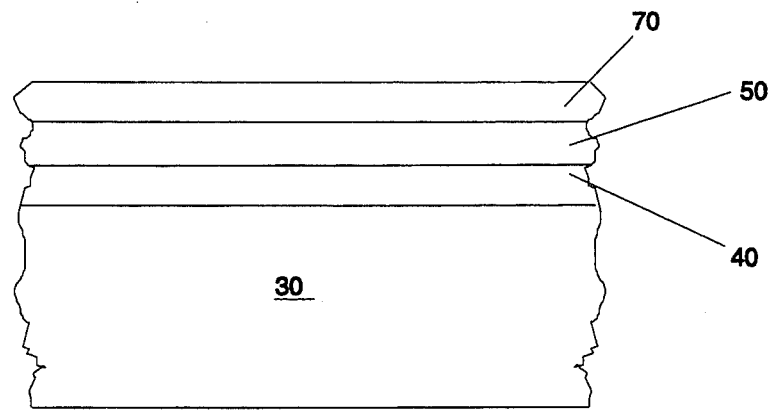
FIG. 7 is a schematic representation in section of a flat panel display that does not utilize an aperture plate but rather utilizes total internal reflection to block the transmission of light to the screen when the layer of scattering material is in the "off" state.

FIG. 7 shows a further embodiment of a display wherein no aperture plate is used but rather total internal reflection is utilized to prevent the unwanted light from reaching the screen. The index of refraction of the scattering layer 40 must be larger than the index of refraction of the cover 50. In that case, only a limited amount of the light can escape when the scattering layer 40 is scattering the light; the remainder of the light will be piped sideways or will reenter the scattering layer 40. In order to prevent optical cross-talk between picture elements, it may be necessary to utilize a dye in the scattering layer 40 so that the light travelling sideways in the light scattering layer 40 is attenuated sufficiently prior to being scattered again.

Figure 8:
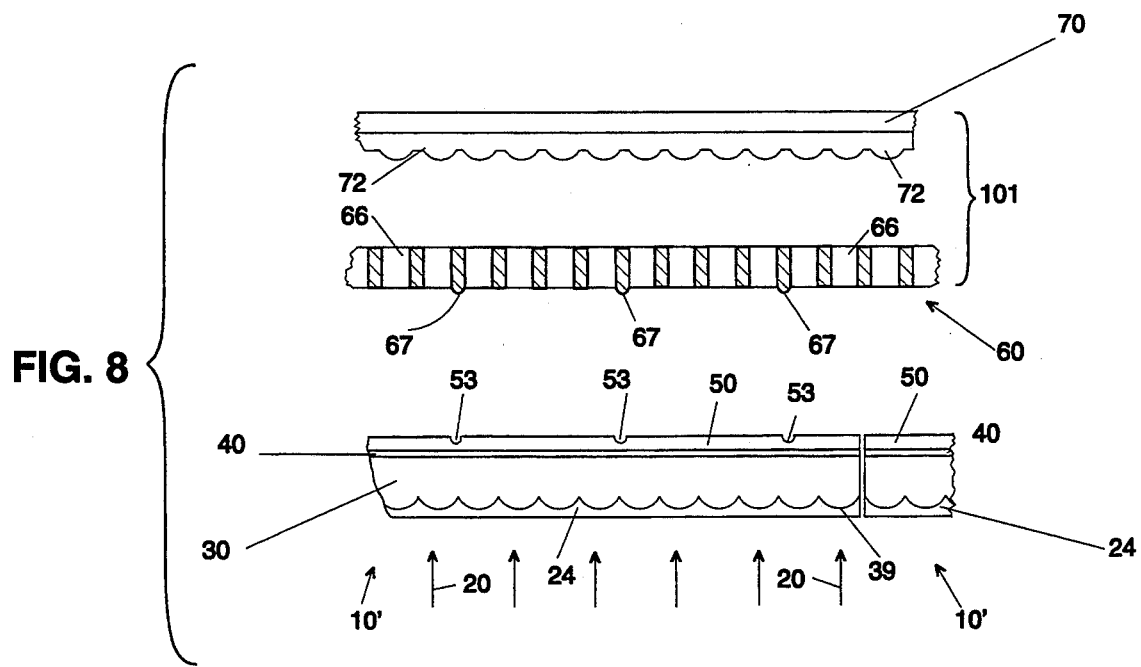
FIG. 8 is an exploded sectional view of a self-alignment structure for a microprojection display.
Figure 9:
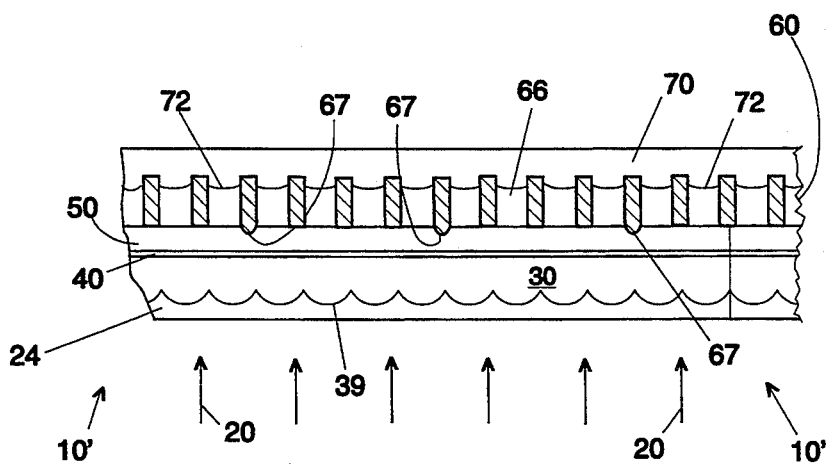
FIG. 9 is a sectional view of the FIG. 8 display in an assembled condition.

FIGS. 8 and 9 show a modification to the microprojection display, wherein proper self-alignment of the display components is accomplished.

The FIGS. 8 and 9 embodiment provides for self-alignment of a global screen 70 and a global aperture plate 60 to a multiplicity of partial display modules 10' each having a separate substrate 30 wherein all materials have coefficients of thermal expansion matched to that of the glass (or plastic) used for the substrate 30. The back surface of the screen 70 has molded onto it a plastic lenticular array 72 that fits into the front openings 66 in the aperture plate 60. The lenticular array 72 performs the function of controlling the manner in which the light from the screen 70 is directed towards the viewer or viewers, as previously described.

In the FIGS. 8 and 9 embodiment, the aperture plate 60 has a series of spherical protrusions 67 at its back surface 62. These protrusions 67 fit into dimples 53 in the front surface of the cover 50. The cover 50 is also aligned with the substrate 30 of each display module 10' by means of alignment pins (not shown) during assembly.

When pressed together, the protrusions 67 and the dimples 53 self-align the display modules 10' so that the picture elements delineated by the active matrix components 36 on the substrate 30 are aligned with the front openings 66 in the aperture plate 60.

Where the cover 50 is plastic, the dimples 53 can be molded. For a glass cover 50, the dimples 53 can be impressed by a die, etched into the glass or photoetched using a laser. Also, there are many well-known micromachining techniques available to achieve the formation of well defined dimples in either plastic or glass.

In the microprojection display of the present invention, a color filter layer can be positioned a significant distance away from the scattering layer 40 without any parallax problem. By contrast, in existing flat panel displays, such as the one disclosed in Brody U.S. Pat. No. 4,980,774, light parallax results if the color filters are spaced apart from the picture elements defined by the active matrix components on the substrate 30. (See col. 9, lines 52–54 of Brody U.S. Pat. No. 4,980,774.) The microprojection display of the present invention does not have such a parallax problem because the light is being directed toward the viewer by the screen 70 and no further optical elements are positioned between the screen and the viewer.

Figure 14:
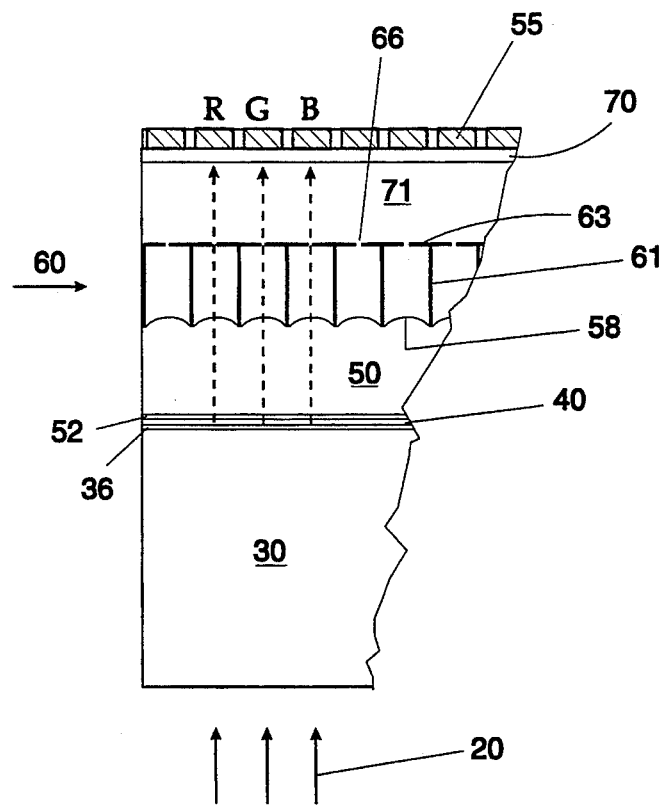
FIG. 14 is a partial view in section of a variation of the microprojection display of FIG. 10 showing placement of color filters in front of the projector screen.

Any number of different types of conventional color filter components (e.g., gelatine or polyimide filters) can be incorporated into the microprojection display. Since collimated light is used, there is no parallax problem in the microprojection display of the present invention. The color filter components can be placed anywhere between the back surface 32 of the substrate 30 and the front surface 74 of the screen 70. FIG. 14 shows the color filter 55 mounted on the front surface of the screen 70. FIG. 14 also shows the faceplate 71 preferably made of transparent plastic or glass interposed between the aperture plate 60 and the screen 70. The faceplate 71 serves as a mechanical support for other components.

In FIG. 14, the aperture plate 60, the faceplate 71, the screen 70 and the color filter 55 are global components fabricated as a single structure. They are thus all part of the global structure 101 shown in FIG. 1B and would be placed over the entire assembled array of partial display modules 10'. Alternatively, elements 60, 71, 70 and 55 of FIG. 14 may be modularized and thus part of a complete display module 10 (FIG. 1A).

FIG. 10 shows an embodiment where the color filter 55 is mounted just in front of the scattering layer 40. In this case the color filter 55 is not a global component but is an integral part of each partial display module 10'.

The ability in the microprojection display system of the present invention to place the color filter anywhere in the display is important since it eases manufacturing constraints. Particularly, the ability to place the color filter at the front of the display allows the designer to utilize the color filter for contrast enhancement.

Another way to achieve a color display is to use a patterned interference filter. The three basic colors are produced by interference of impinging light rays within a multi-layer structure of transparent thin films. These filters offer a wide color gamut and are free from absorption. However, in a direct-view display, there is a strong dependence of perceived color on viewing angle. Because the microprojection display modules 10 and 10' of FIGS. 2–6 and 8–9 use an area source of collimated light, shown schematically by the parallel light rays 20, there is no angular dependence, so long as the interference color filters are placed in the path of the parallel rays 20. Thus the microprojection display modules 10 and 10' can employ highly efficient interference filters, which additionally offer the opportunity to obtain a wider color gamut than is achievable with conventional filters.

Figure 16:
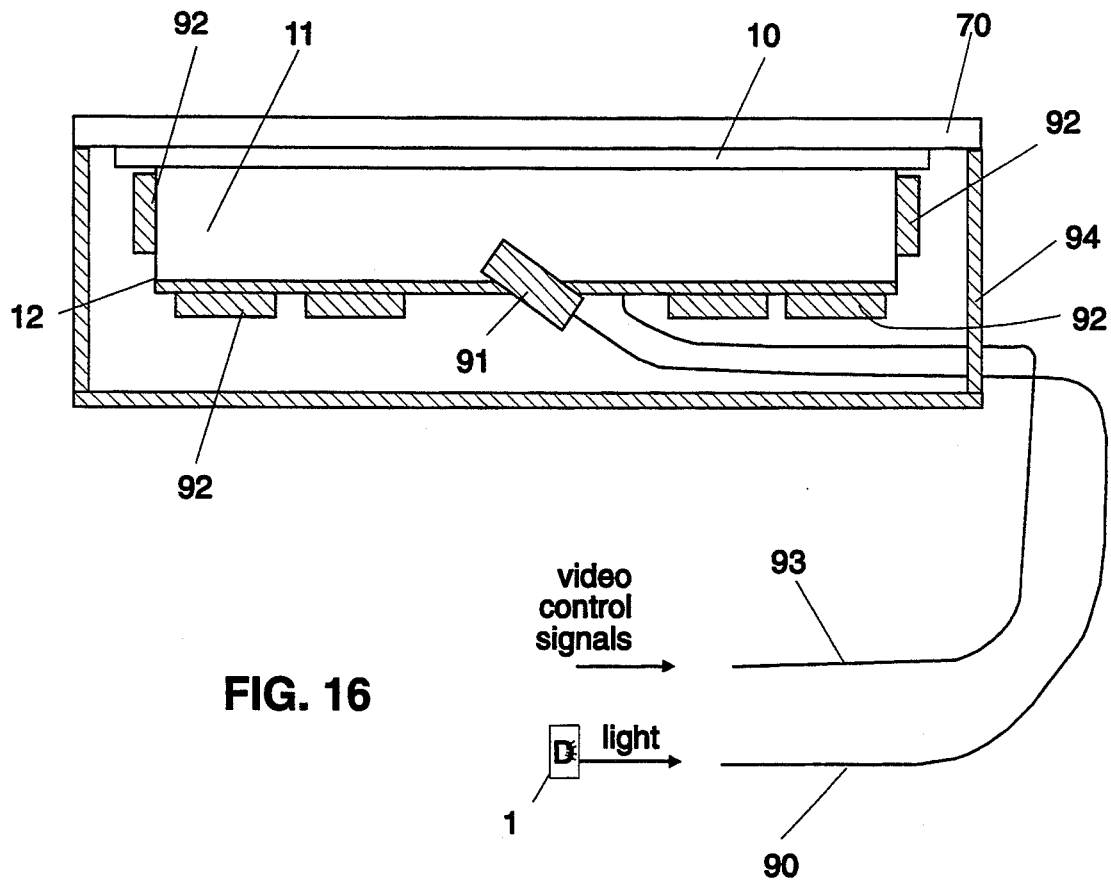
FIG. 16 is a schematic representation of a microprojection display system where no components are modularized.

All of the features of the microprojection display discussed in this application are directly applicable to a single-substrate (non-modular) display system such as shown in FIG. 16. The non-modular display system of FIG. 16 is, in effect, a one-module display and employs only one display module 10. Since there is no requirement for an invisible seam in this embodiment, the pixels need not be brought out to the very edge of the display substrate. The substrate can therefor be made slightly oversized and the electrical connections can be made without the need for wraparound metallization.

In the FIG. 16 display, the light from a remote light source 1 travels through optical fiber 90 to coupler 91 where it is coupled to a flat fiber-optic illuminator 11. The illuminator 11 provides collimated light to the microprojection display module 10, which in turn projects the image out toward the viewer through screen 70. The electronics 92 for the control of the display system are mounted on the side walls and rear surface of the housing 12 of the illuminator 11. Thus, the electronics do not cast a shadow. Video control signals to the electronics are provided by wires 93.

The non-modular display system of FIG. 16 is particularly useful in situations where a remote light source is desirable, such as in an aircraft cockpit. The remote light source can be placed at a location where cooling and maintenance can be conveniently provided. Also, the size of the light source is not limited in the FIG. 16 system by the size of the display housing 94. The light source can be designed with high light output to fully compensate for optical losses in the system. The unwanted infrared radiation can easily be filtered out, so that only "cool" white light reaches the display surface. Also, acoustical noise from cooling fans is not a problem.

Finally, it should be noted that in a non-modular display, such as that shown in FIG. 16, the choice of scattering medium is no longer limited to PDLC, or other "solid" material, since the requirement for an invisible seam does not apply. Other scattering media, such as dynamic scattering nematic liquid crystal material, or randomly oriented nematic liquid crystals (RON LC) can be utilized for the scattering layer, thus providing additional design flexibility. Media which diffract or refract light such as oil or plastic films can be employed.

Figure 17:
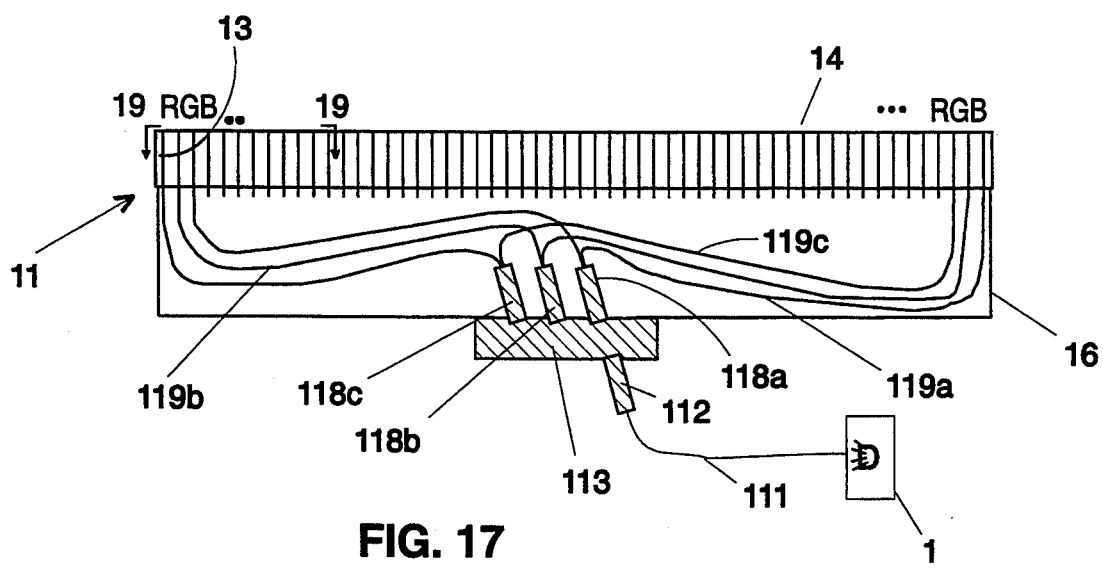
FIG. 17 is a schematic representation in section of one module of a thin fiber-optic illuminator of the present invention that produces collimated light for use with a color display system whereby there is a one-to-one correspondence between the number of fibers and the number of addressable picture elements of the display.
Figure 18:
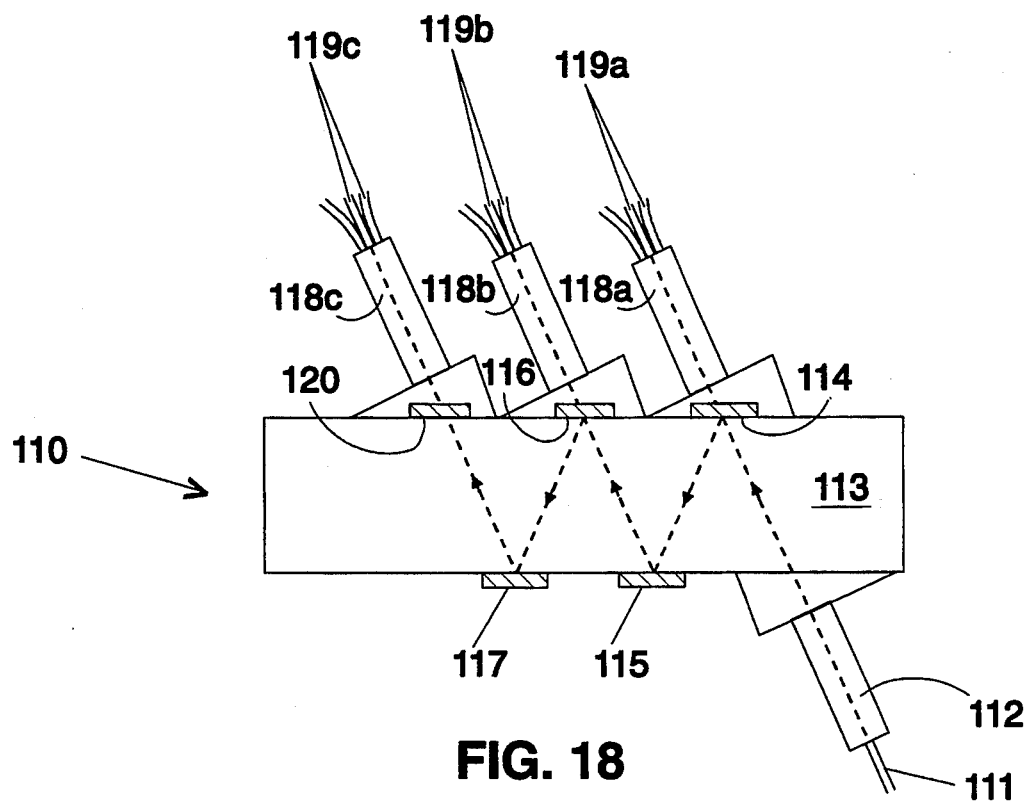
FIG. 18 is a detail view of color separating components utilized in the illuminator of FIG. 17.
Figure 19:
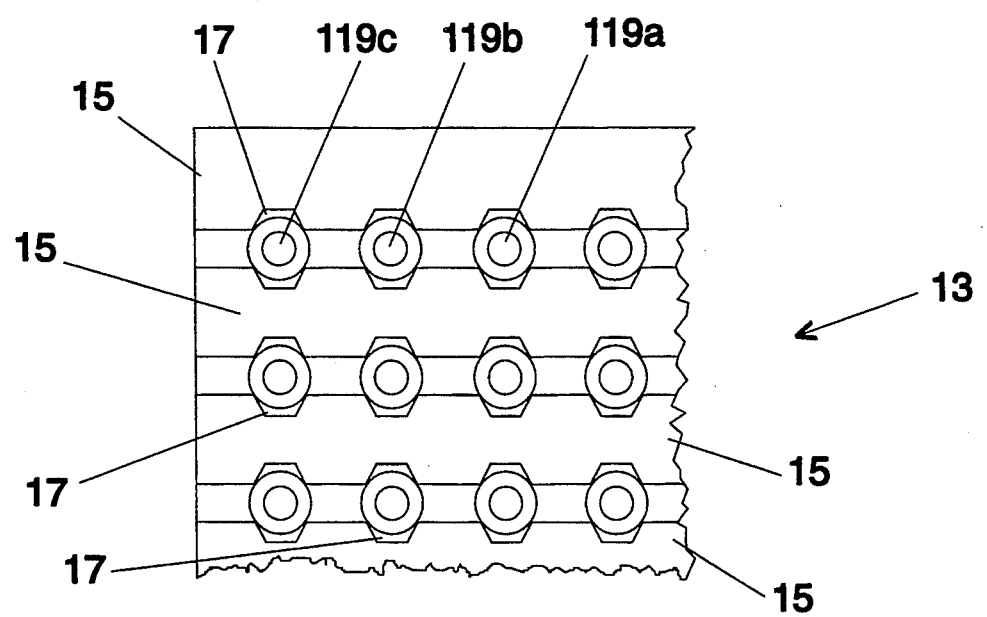
FIG. 19 is a front view of the illuminator of FIG. 17 along lines 19—19 showing the placement of fibers in a light distribution plate.

FIGS. 17–19 show one module of a thin color illuminator 11 that may be used with the microprojection displays shown in FIGS. 2–6 and 8–9 so as to result in a complete flat-panel display system. The illuminator 11 of FIGS. 17–19 uses an individual fiber to illuminate each pixel of a display. The illuminator 11 takes advantage of the fact that a GRIN lens, as described below with reference to FIG. 28, can produce a beam of highly collimated light from a single optical fiber. Such highly collimated light can be coupled into a multiplicity of fibers, which will be distributed within the body of the illuminator 11 into an illumination plate 13. The illumination plate 13 holds the fibers so that they are spaced equidistantly and aligned perpendicularly to a front surface 14 of the illuminator 11. This is achieved by employing self-aligning V-grooved substrates 15 (made of etched silicon wafers or molded plastic) in the plate 13, each substrate having a plurality of V-grooves 17 as is shown in FIG. 19. The fibers are held in the V-shaped grooves 17 when the whole family of substrates 15 is pressed together and secured with the aid of an adhesive. The front face of the plate with exposed fiber ends is then ground and polished to produce well defined flat fiber ends. A cover 16, preferably made of molded plastic, is securely attached to the perimeter of the light distribution plate 13 by means of adhesive.

For a monochrome active-matrix display system, the number of the fibers will be the same as the number of addressable picture elements on the active-matrix substrate. Thus, each addressable picture element will have its own collimated light source. For a color illuminator such as that shown in FIG. 17, there are three groups of optical fibers, one for each of the primary colors (i.e. red, green and blue), used for color dots delineated on the active-matrix substrate, thus eliminating the need for a mosaic-type color filter.

FIG. 18 shows a manner of generating color in the body of the illuminator 11 using a color separator 110. Referring to FIGS. 17–18, white light from a suitable source 1 enters coupling means 112 from main fiber 111. The light travels through the coupling means 112 into glass block 113 and impinges on blue interference filter 114 positioned on a front surface of the glass block 113. Blue interference filter 114 allows only blue light to pass through it to the coupling means 118a. A large number of multi-mode fibers 119a are connected to the output of the coupling means 118a to allow multiple transmissions of blue light to the light distribution plate 13. The optical fibers may be made of any number of different materials, such as plastic, plastic coated silica or glass. Any number of different coupling means 112 and 118 well known in the art may be used, such as the GRIN lens described below with regard to FIG. 28. The source 1 may be an arc lamp, an incandescent lamp, or any other small area source of radiation that produces or generates radiation (such as light) that can properly interface with the coupling means 112 through fiber 111. A metal halide arc lamp is preferred due to its well-balanced visible radiation and high efficacy.

The remaining components of the white light are reflected by filter 114 to first mirror 115 positioned on the back surface of the glass block 113. Mirror 115 reflects the light to green interference filter 116 on front surface of the glass block 113. The filter 116 allows green light to pass through coupling means 118b and then to fibers 119b. The remaining light is reflected to second mirror 117 on the back surface of the glass block 113, which in turn directs the light to red interference filter 120 on the front surface of the glass block 113. The red light is allowed through the filter 120 and passes through coupling means 118c to fibers 119c. Any remaining radiation that is not allowed through red interference filter 120 is reflected back, away from the display surface, to be absorbed by a heat sink (not shown).

The illuminator 11 is designed as a light source for a modular display such as the flat panel microprojection displays 10 and 10' described above. In such a microprojection display, electronic components may be secured to the back side of a cover 16 for the illuminator 11. Thus, these electronic components are positioned behind the point light sources for the display, namely the ends of the fibers secured in the distribution plate 13. As a result, the electronic components do not cast a shadow. Illuminator cover 16, preferably made of molded plastic, will act as an assembly housing, providing the necessary mechanical support for the color separator and protection for the three groups of optical fibers. The cover 16 can include means for mounting multiple illuminator modules 11 in precise juxtaposition to each other.

Figure 15:
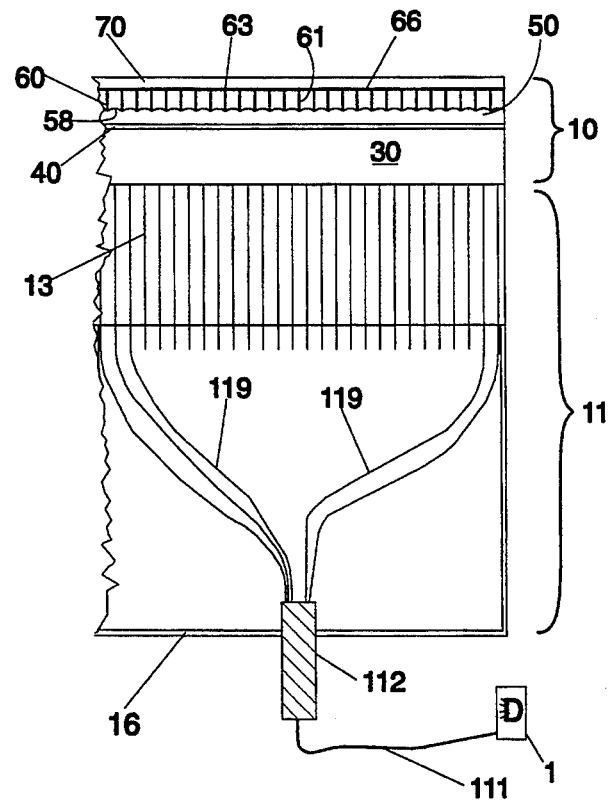
FIG. 15 is a schematic representation in section of an embodiment of the display system of the present invention utilizing the microprojection displays of either FIGS. 2A or 2B and a thin fiber-optic illuminator, where there is a one-to-one correspondence between the number of fibers and the number of addressable picture elements of the display.

FIG. 15 shows one module of a monochrome display system of the present invention where the flat fiber illuminator 11 is identical to that shown in FIGS. 17–19, except for the absence of the color separator 110 and related coupling means. The microprojection display module 10 in FIG. 15 is identical to that described above with respect to FIG. 2A, though it is readily understood that the partial display module 10' and the global structure 101 may also be used also in the FIG. 15 embodiment. The light from a source 1 is transmitted by fiber 111 to coupling means 112, which couples the light to multiple optical fibers 119. The fibers 119 are secured within the light distribution plate 13, as described above with reference to FIGS. 17 and 19. The light emanating from these fibers 119 serves as the effective point light sources for the microprojection display module 10, which consists in main part of substrate 30 with its accompanying active-matrix components 36, scattering layer 40, backplane electrode 52, cover 50 with microlenses 58, aperture plate 60 having front openings 66 and side walls 61 and front walls 63, and rear-projection screen 70, as previously described. The FIG. 15 display module can be configured to be a multiplexed display, as well as an active matrix display. The preferred manner of securing the illuminator 11 to the display module 10 is by use of an adhesive bond.

Figure 20:
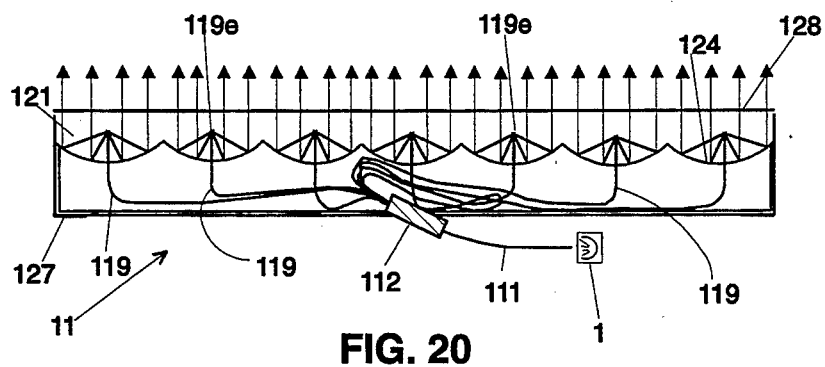
FIG. 20 is a schematic representation in section of one module of a further embodiment of a thin fiber-optic illuminator that produces collimated light.

FIG. 20 shows one module of a further embodiment of a flat illuminator 11 for producing collimated light. A small area light source, represented schematically as element 1, directs light through main fiber 111. That light is coupled to a group of optical fibers 119 through coupling means 112.

Individual strands of the optical fiber group 119 enter into a base 121 of the illuminator 11. The base 121 preferably is made of a transparent plastic such as acrylic or other suitable plastic which is easy to mold. However, any other transparent optical media, such as glass, may be utilized for the base 121. The back surface of base 121 is shaped into an array of multiple parabolic surfaces.

The fibers 119 are spread equidistant from one another within the base 121. Appropriate annular openings in the base 121 for receipt of the fibers 119 are made by drilling with a laser. There are numerous other ways to produce the openings in the base 121, such as jet machining, precise drilling and photoetching. Each opening has a diameter at least slightly greater than the largest diameter of each fiber 119.

A set of parabolic reflectors 124, preferably made of evaporated thin metallic films or a combination of metallic and dielectric films (enhanced metallic reflectors), is formed at, or attached to, the back surface of the base 121 and thus follows the shape of the molded array of multiple parabolic surfaces.

Each parabolic reflector 124 has a central annular opening through which individual fibers 119 pass. As with openings in the base 121, the diameter of each of the openings in the reflectors 124 is at least slightly greater than the largest diameter of each fiber 119. The parabolic reflectors 124 are attached to the base 121 such that the openings in the parabolic reflectors 124 and the openings in the base 121 align with one another, and thus the fibers 119 maintain their vertical alignment. There is one parabolic reflector 124 for each fiber 119 in the FIG. 20 embodiment.

The surface of each parabolic reflector 124 has a reflective coating such as aluminum or silver or other reflective materials.

The base 121 provides support for the fibers 119. The end 119e of each of the fibers 119 is treated such that the light emanating out of each end 119e is reflected backward toward the reflective coating of the corresponding parabolic reflector 124. Typically, the end 119e of each of the fibers 119 has a diameter of 0.5 mils. The end 119e of each fiber 119 is positioned at the focal point of the corresponding parabolic reflector 124 and therefore the light that is reflected back to the parabolic reflector 124 and then reflected forward by reflective coating is collimated, as shown schematically by the light rays in FIG. 20. In effect, due to the small dimension of each end 119e, each end 119e of each optical fiber 119 serves as a point light source for its corresponding parabolic reflector 124.

An opaque cover 127, which can be a piece of molded plastic, is attached to the back sides of the parabolic reflectors 124 in order to protect the parabolic reflectors 124 and fibers 119. The coupling means 112 serves as a "feed-through" for optical fiber 111 to enter through the cover 127 and to branch fiber 111 into multiple fibers 119. The cover 127 can be secured to the perimeter of the base 121 by means of an adhesive or the like.

The position of the ends 119e of the fibers 119 can be secured within the base 121 by using an optical adhesive to affix each end 119e in the base 121, so long as the ends 119e reside at the respective focal points of the parabolic reflectors 124.

The front surface 128 of the base 121 is flat, allowing for easy assembly of any display substrate that is placed over the illuminator.

In the flat illuminator shown in FIG. 20, the cover 127, the parabolic reflectors 124 and the base 121 have the same coefficient of expansion so that external conditions, such as temperature, have the same effect on all components.

Various ways of treating the ends 119e of the optical fibers 119 for the FIG. 20 embodiment are shown in FIGS. 21A–21F.

Figure 21A:
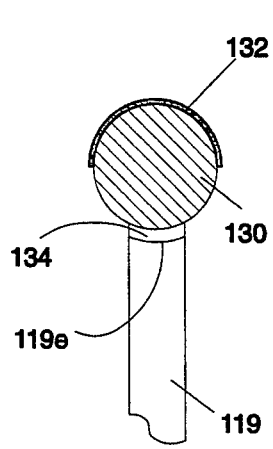
FIGS. 21A–21F are detail views in isolation of various manners of treatment of the ends of the optical fibers utilized in the illuminator of FIG. 20.

A preferred manner of treatment, amongst the treatments shown in FIGS. 21A–21F, is the treatment shown in FIG. 21A. In FIG. 21A, a spherical droplet 130 of a light scattering or diffusing medium is adhered to fiber end 119e by means of an optical adhesive 134. The droplet 130 in FIG. 21A typically has a diameter of 2–3 mils. A reflective layer 132 is attached to the top surface area of the droplet 130 such that the light emanating from the end 119e of the fiber 119 and through the droplet 130 is reflected backwards toward the parabolic surfaces 124.

The layer 132 is placed on the droplet 130 by means of evaporation, painting, or by any other coating technique. The layer 132 is preferably a reflective metallic substance such as aluminum or silver. Also, a combination of metallic and dielectric reflective materials such as metal oxides may be used.

Figure 21B:
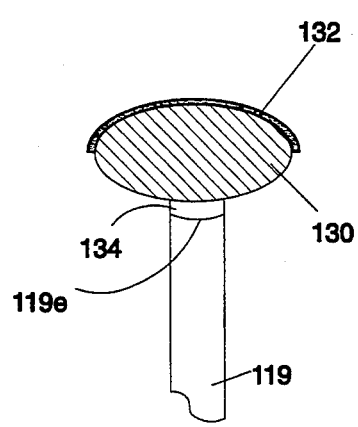
Figure 21C:
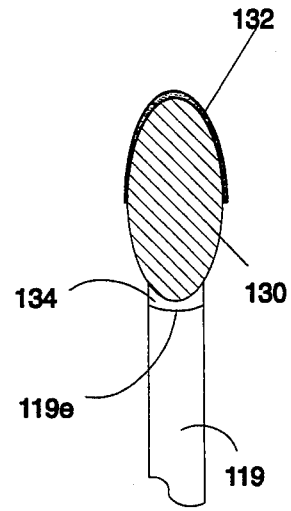

FIGS. 21B and 21C show variations of the treatment of the fiber ends 119e shown in FIG. 21A. In FIGS. 21B and 21C the droplet 130 is elongated into an oval shape, with the FIG. 21B droplet 130 being elongated perpendicular to the axis of the fiber 119 and the FIG. 21C droplet 130 being elongated along the axis of the fiber 119. This elongation of the droplet 130 controls the directivity of the emanating light, which in turn controls the uniformity of illumination.

The droplet 130 in FIGS. 21A, 21B and 21C serves the purpose of redistributing the light emanating from the end 119e of each fiber 119, thereby canceling the effect of the typical fiber distribution pattern where most of the light emanating from an optical fiber end is concentrated along the central axis of the fiber and the intensity of light decreases rapidly with increased angle from the optical axis of the fiber. For example, the droplet 130 in FIG. 21A insures uniform distribution of light emanating from the end 119e of the fiber 119.

Figure 21D:
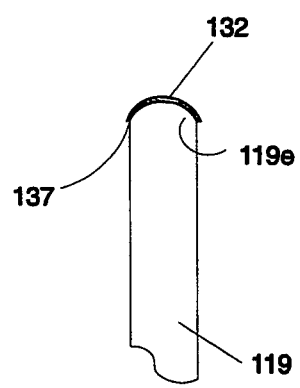
Figure 21E:
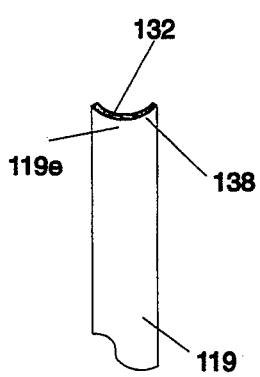

FIG. 21D is yet another variation on the treatment of the fiber end 119e, whereby the fiber end 119e has a top convex surface 137 and the reflective layer 132 is attached to that surface 137. FIG. 21E is similar to FIG. 21D except that fiber end 119e terminates in a concave surface 138 and reflective layer 132 is attached to the concave surface 138.

Figure 21F:
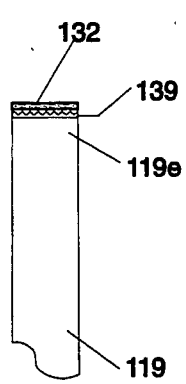

FIG. 21F shows yet a further manner of configuring the fiber end 119e, whereby end 119e is flat and has attached to it a light diffusing layer 139. On top of light diffusing layer 139 is reflective layer 132. The layer 139 acts to diffuse or scatter the light impinging on it from the fiber end 119e in a random fashion while the reflective layer 132 improves the efficiency of this configuration by reflecting back the light which would otherwise be scattered forward and lost for collimation process.

Any number of different configurations and treatments of the fiber ends 119e may be used in order to accomplish the back reflection of light from the fiber ends 119e toward the parabolic reflectors 124 in the FIG. 20 embodiment.

Because the pattern of the stray light from the fiber ends 119e in the FIG. 20 illuminator cannot be precisely controlled, some stray light is reflected back to an adjacent parabolic reflector 124 rather than to the parabolic reflector 124 located directly behind each respective fiber end 119e. Since such stray light does not emanate from the focal point of the parabolic reflector 124 on which it impinges, that light will be reflected by the adjacent parabolic reflector 124 in a way that does not produce collimated light. The light then exits from the body of the illuminator 11 only partially collimated, thus degrading the performance of the flat-panel microprojection display system. There will be a slight reduction of the brightness and contrast ratio, because of the stray light. The brightness is reduced because the stray light is lost to the collimated illumination produced by the parabolic reflectors 124 and cannot contribute to the brightness of the "on" pixels. The stray light is either captured and absorbed in the aperture plate or it reaches the viewer through a pixel which is in the "off" state. In this latter case the contrast ratio is decreased.

Figure 24:
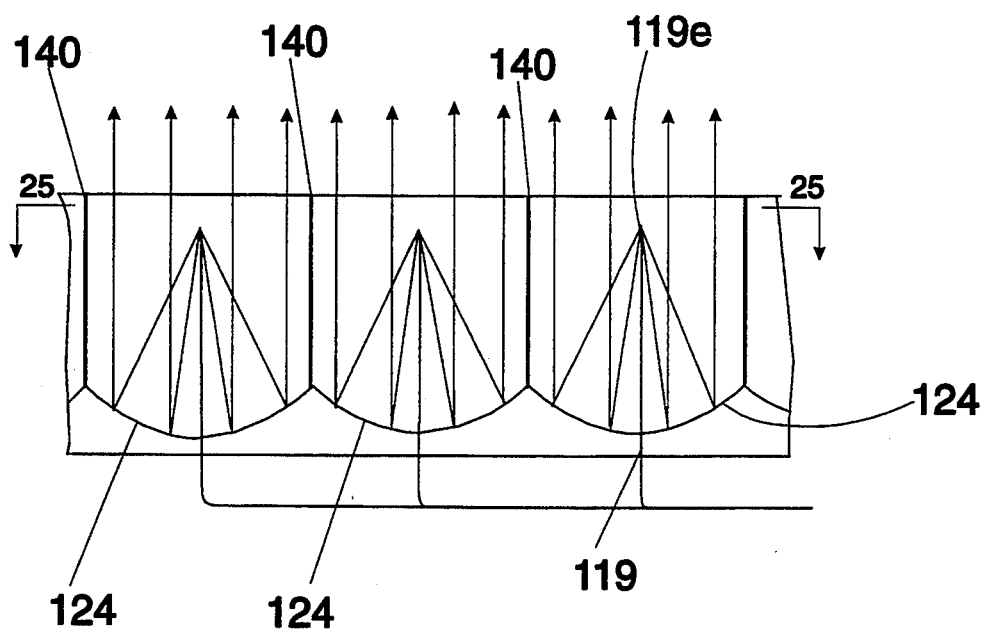
FIG. 24 is a schematic representation in section of a variation of the illuminator of FIG. 20 whereby the effects of stray light on the operation of the illuminator are reduced by use of an optical divider positioned in the illuminator structure.
Figure 25:
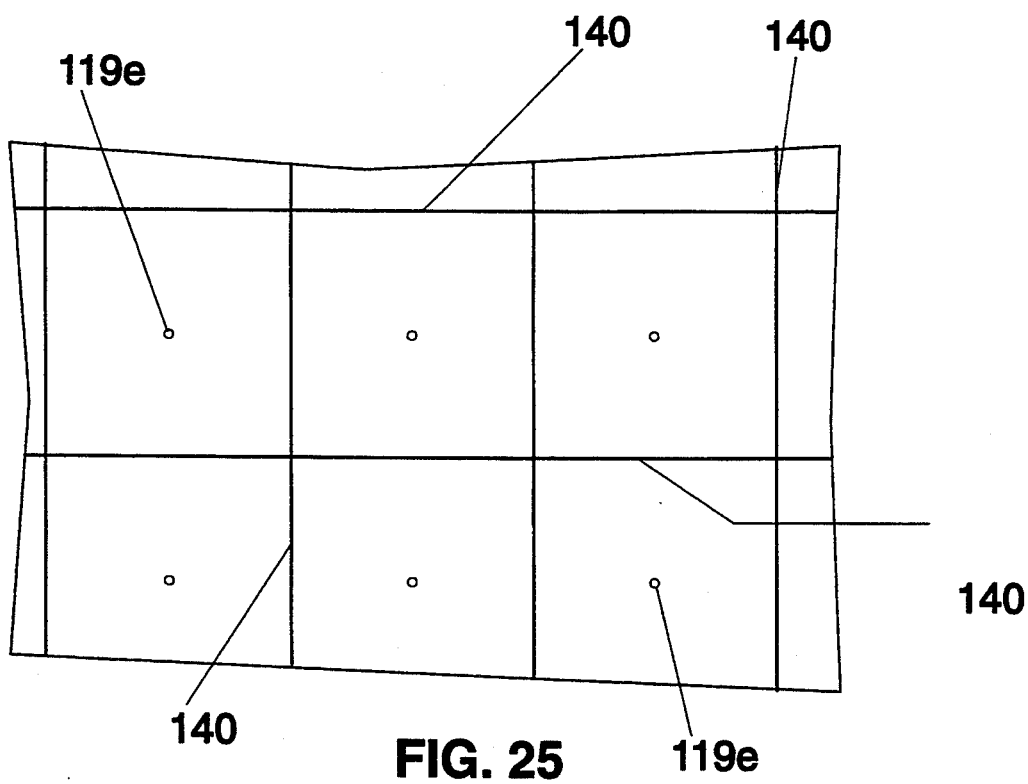
FIG. 25 is a front view along lines 25—25 of FIG. 24.

FIGS. 24–25 show a variation of the FIG. 20 illuminator. In FIGS. 24–25, structure is shown to combat this stray-light problem. Opaque dividers 140 are placed between the parabolic reflectors 124. These dividers can be made of black plastic or metal and designed to fit into grooves molded into the reflector base. The stray light is absorbed by the dividers 140 and therefore does not impact an adjacent parabolic reflector 124. A further view of the dividers 140 is shown in FIG. 25, which is a view along lines 25—25 in FIG. 24. As seen in FIG. 25, the dividers are configured in an open box-like shape around each parabolic reflector 124.

Figure 22:
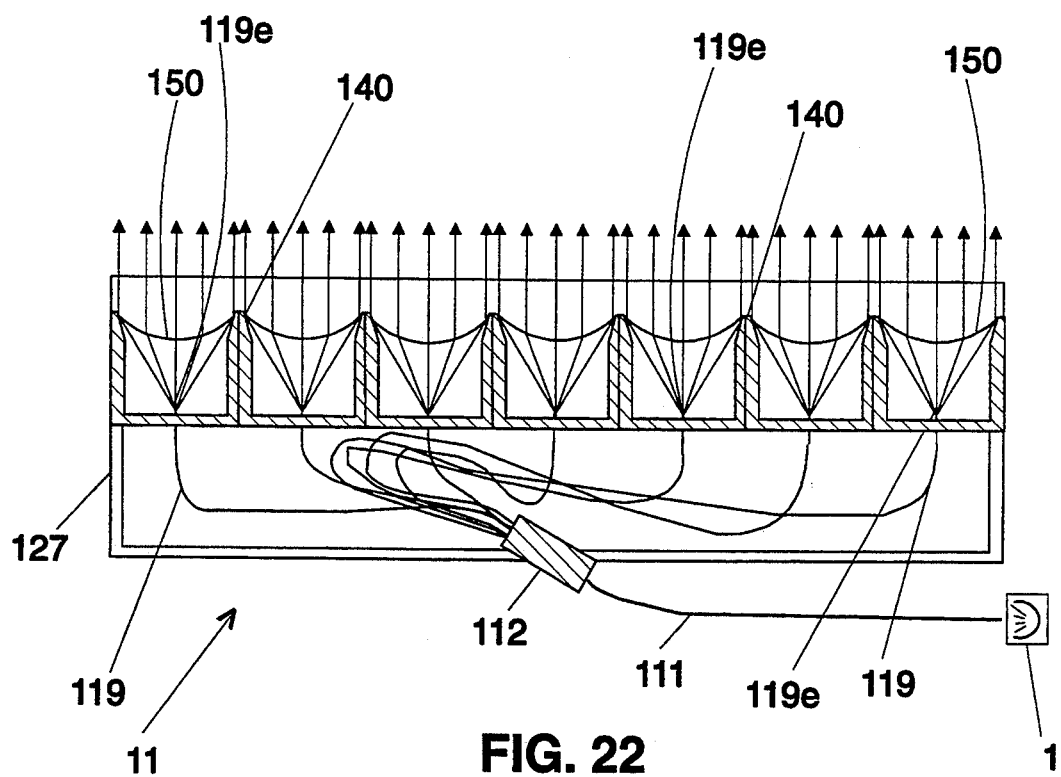
FIG. 22 is a schematic representation in section of one module of a further embodiment of an illuminator that produces collimated light.

FIG. 22 shows a further embodiment of a flat illuminator for producing collimated light utilizing refraction instead of reflection as in the FIGS. 20 and 24 embodiments. A lens array 150 is used. The dividers 140, as in the FIG. 24 embodiment, absorb stray light rays. The ends 119e of the fibers 119 are positioned at the respective focal points of the lenses 150. Light emitted from the ends 119e of the fibers will have a solid angle dispersion that is a function of the fiber and total optical system design. The lens array 150 will be designed so that a major part of the emitted light will be collected by the lenses 150 and only small portion by the dividers 140.

FIG. 22 shows a design for this type illuminator configured into a module. The array of plastic lenses 150 is molded from optically clear plastic. The divider 140, made of black material such as plastic or metal, in addition to capturing stray light rays, also provides the required mechanical rigidity for the illuminator, which can serve as a support for substrate 30. The dimensions of the lenses 150, as well as the dimensions of the divider 140, are such that the discontinuities between lenses 150 will be aligned with the black surround in an accompanying mosaic color filter. Color dots in a mosaic color filter are separated by an opaque (black) grid called a black surround. The black surround is utilized in most traditional color liquid crystal displays to block any stray light which may pass unmodulated through the liquid crystal display. As a non-active part of the display surface, the black surround can be utilized to hide unwanted optical artifacts, such as the delineation of the dividers. In this way, the separation of the lenses 150 will not produce any brightness non-uniformity visible on the front surface of the display. In the FIG. 22 illuminator, the ends 119e of the fibers 119 are cut and polished to improve light output and uniformity of illumination.

Figure 26:
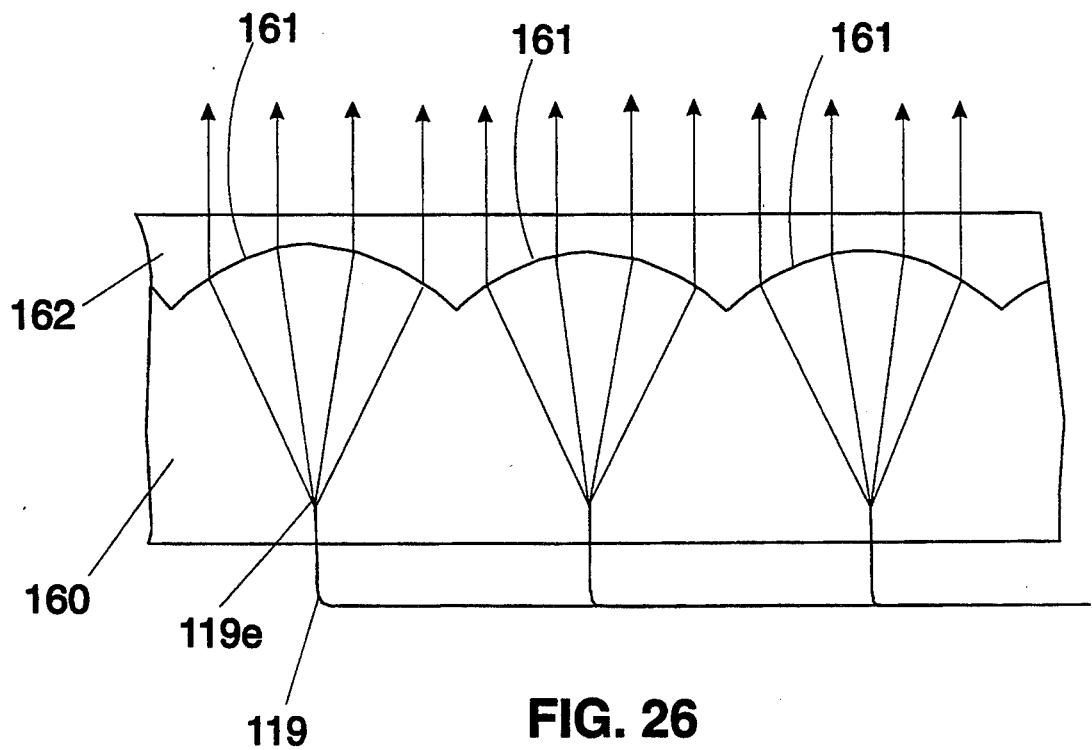
FIG. 26 is a schematic representation in section of a further embodiment of a thin fiber-optic illuminator that produces collimated light.

FIG. 26 shows a further embodiment of an illuminator that also produces collimated light. In FIG. 26, the individual optical fibers 119 are located in a base 160. An array of lenses 161 is molded in base 160 whereby the focal point for each lens 161 corresponds to the location of the corresponding end 119e of each optical fiber 119. A cover 162 is made of transparent material with a lower index of refraction than the base 160 and provides a needed flat surface as well as a refractory interface. There is one lens 161 for each optical fiber 119.

As seen in FIG. 26, the light emanating from the ends 119e of the fibers 119 passes through and is collimated by the lenses 161. The collimation occurs because the fiber ends 119e are positioned at the respective focal points of the lenses 161. No reflective layer is necessary on the fiber ends 119e, since there is no backward reflection. However, the overall illuminator thickness will typically be greater in the FIG. 26 embodiment compared to the FIG. 20 embodiment for the same number of fibers because of the narrow exit angle of the light emanating forward from the fiber ends 119e of the FIG. 26 embodiment compared to the widely scattered light emanating from the treated ends 119e for the FIG. 20 embodiment.

The illuminators shown in FIGS. 17–22 and 24–26, when used as part of a display system, do not produce any significant reflections from the vertical walls of the display substrate since the light beam is substantially parallel to the vertical walls of the display substrate.

Further, there is no shadowing problem as to any electronics mounted behind the ends of the fibers that emanate the light.

The illuminators shown in FIGS. 17-22 and 24-26 may be used with displays where the display comprises discrete modules, or with a display that is non-modular, such as shown in FIG. 16.

For a modular display the illuminators shown in FIGS. 17-22 and 24-26 provide uniform illumination from edge to edge of the substrate. The illuminators also provides a flat front surface for attachment by means of bonding or the like to a display substrate. Further, the illuminators are mechanically sturdy and allow for attachment of electronic driver circuitry so as not to obstruct the path of the illuminating light. The illuminators can also feature means for mounting multiple modules in precise juxtaposition to each other.

Further, the illuminators shown in FIGS. 17-22 and 24-26 may be used in any situation where a thin large area source of collimated radiation is desired. Examples of such other uses include traffic signs (where directionality is important), search lights, car head lamps, heaters, etc.

Figure 23:
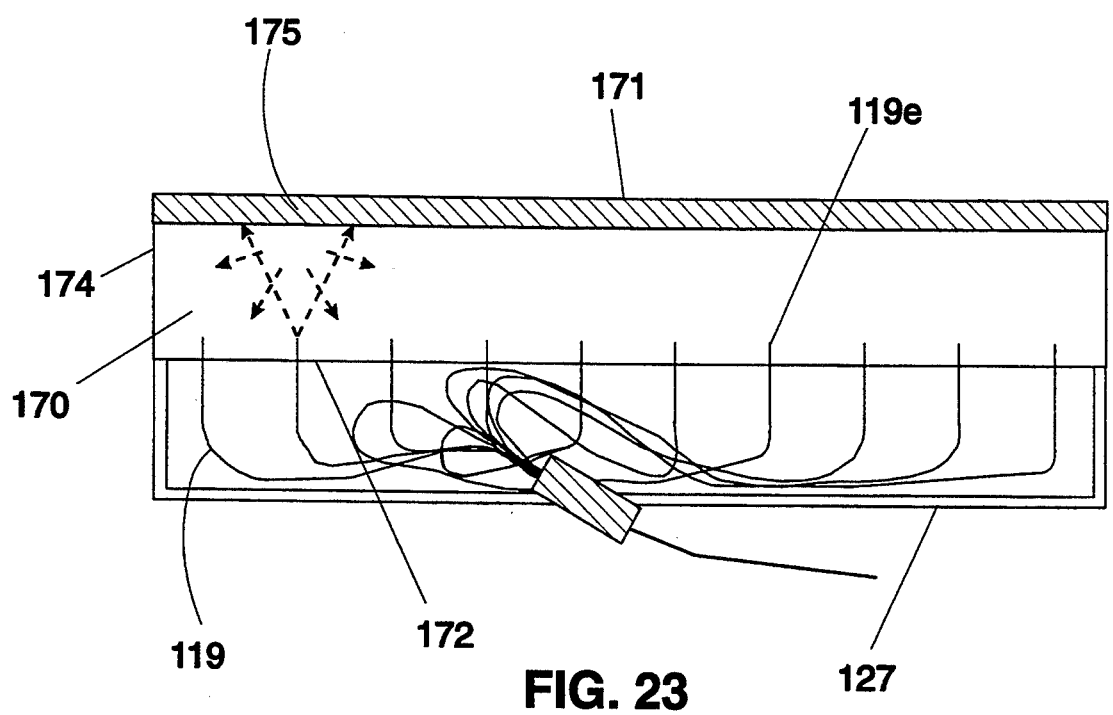
FIG. 23 is a schematic representation in section of one module of a thin fiber-optic illuminator that produces diffuse light wherein a display substrate is mounted on a front surface of the illuminator.

FIG. 23 shows a further embodiment of a flat illuminator whereby non-collimated (diverging) light is produced. Optical fibers 119 are embedded in a molded plastic base 170. The ends 119e of the fibers are cut and polished for improved optical coupling. The divergent light from the fiber ends 119e is transmitted out to the front surface 171 of the illuminator. The illuminator of FIG. 23 may be used in place of fluorescent lamps or where high brightness is required, or in situations where the light source is detached from the display surface as, for example, in avionics. One particular application of the FIG. 23 embodiment is for backlighting modular liquid crystal displays.

In the illuminator shown in FIG. 23, the back surface 172 of the base 170 is provided with a reflective coating in order to maximize the use of available light. The side walls 174 of the base 170 are also provided with a reflective coating. The reflective coatings on the side walls 174 and the back surface 172 of the base 170 redirect any light that is reflected back from the front surface 171 of the illuminator. The reflective coatings redirect the light out of the base 170 and toward the front surface 171.

The reflective coatings are particularly useful where an additional substrate 175 is used on top of the base 170. In active-matrix display systems, a substrate 175 made of opal glass, glass ceramic or the like is sometimes used in order to hide the structural elements of the display from the viewer. However, ideal light diffusing material scatters 50% of impinging light backward. Therefore, in the FIG. 23 arrangement, the reflective coatings act to redirect the light scattered by the light diffusing substrate through the base 170, through the substrate 175 and to the front surface 171.

Thus, the reflective coatings in the illuminator shown in FIG. 23 increase the optical efficiency of the entire illuminator and any associated display system.

Figure 28:
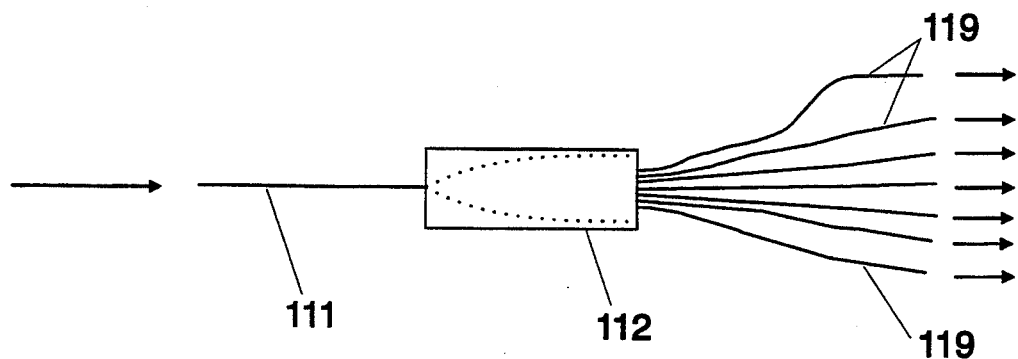
FIG. 28 is a view in isolation of a GRIN optical coupler for use in coupling one optical fiber to a plurality of optical fibers.

FIG. 28 shows a configuration whereby light from a single optical fiber 111 can effectively be coupled to a plurality of optical fibers 119, thereby minimizing the number of optical fibers required for any illuminator. The optical coupler 112 of FIG. 28 utilizes a GRIN microlens of 0.25 or 0.15 pitch, which is based on GRadient INdex technology known in the art. Such commercially available couplers are small, rigid and allow for easy connection of a main distribution fiber to the body of an illuminator and its multiple internal distribution fibers. By use of such technology, a single optical fiber, such as 111, can have its light output coupled to multiple fibers 119, thus achieving desired branching. In addition, the degree of divergence of the coupled light can be controlled by the pitch (length) of the GRIN lens. This characteristic of the GRIN lens is used to produce well-collimated beamlets of light in the illuminator designs discussed above.

Figure 27:
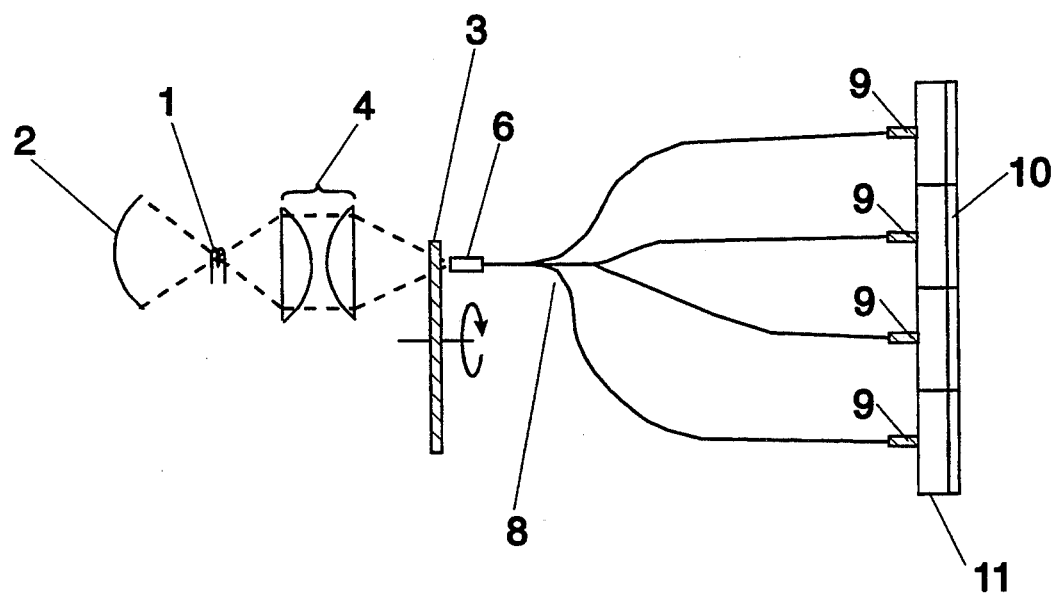
FIG. 27 is a schematic representation of a color flat-panel display system of the present invention that includes a color wheel, a thin fiber-optic illuminator and a microprojection display.

The illuminators shown in FIGS. 17-22 and 24-26 may be utilized as part of complete flat-panel color microprojection display systems, for example, in the manner shown in FIG. 27. In the display of FIG. 27 a color display is accomplished by using temporal (also known as frame sequential) color mixing.

Most existing flat-panel color displays utilize spatial mixing, where each pixel or picture element contains three color dots, namely red, blue and green. The color dots in a spatial color mixing system are small enough such that the human eye cannot distinguish them as separate dots, but rather integrates all three dots as one pixel.

In frame sequential mixing, each pixel is illuminated in sequence with red, blue and green light as needed. The eye of the viewer cannot distinguish the quickly changing color sequence, but rather integrates the three-color information sequence into one resulting color. Frame sequential mixing has an advantage over spatial mixing, particularly with regard to active matrix fabrication, as fewer buses are required in order to obtain the same resolution due to the fact that the number of addressable pixels is reduced by a factor of 3 (or 4, depending on the number of color dots used to make a color pixel).

The display system of FIG. 27, which is configured in a manner similar to the configuration of the system shown in FIG. 1A, operates as follows. A small area light source 1 such as an arc lamp is located in front of a rear spherical mirror 2. The mirror 2 reflects forward toward the display the substantial part of light from the light source 1 that is emitted towards the rear. In front of the light source 1 is condenser lens 4 that collects the light emanating forward from the light source 1 and also the light reflected by the rear spherical mirror 2. The light from the condenser lens 4 passes through a rotating wheel 3 that has color filter segments, for example red, blue and green. The wheel 3 is placed so that it intersects the optical path of the light where the cross-section of the light beam is small, thus making the mechanical aspects of the system simple to manage. The light is then transmitted to coupling optics 6, which couple the light to optical fibers 8. Coupling means 9 then couples the light from fibers 8 to the modular illuminators 11.

Conventional interference filters can be used for the color filter segments in the wheel 3, allowing for almost unrestricted design of spectral curves, yet producing negligible absorption losses in the required bandwidth. The frame sequential scheme results in perfect color registration and reduces the complexity of, for example, an active-matrix display where each color pixel requires only one matrix element. Also, the number of interconnections is significantly reduced and the fill factor is improved, increasing the optical efficiency of the display.

In an active-matrix display system employing frame sequential color, as described above with reference to FIG. 27, the fill factor can be significantly improved since only a single thin film transistor is required for each complete color pixel. When spatial color mixing is used, each color pixel must be divided into three or four sub-pixels (color dots), each of which requires a thin film transistor and its associated interconnections. The area required for the additional transistors and busses blocks light, reducing the fill factor. By using frame sequential color the area that blocks the passing light is minimized, resulting in a brighter display. Furthermore the optical system of a flat-panel display that utilizes frame sequential color can be designed so that the entire area of any addressable pixel can be filled with a single desired color. Also the pixel size of monochrome images remains the same as that of full color images. This is useful for displays that sometimes operate in monochrome mode, such as night vision displays for military applications.

Referring to FIG. 27, the modular illuminators 11, which may be of the type described above with respect to FIGS. 17–22 and 24–26, receive the light from the optical fibers 8 through coupling means 9, and then transmit the light to complete display modules 10, which may be any of the microprojection display modules described above. Of course, the system of FIG. 27 may also be used with the partial display modules 10' and the global component 101 of FIGS. 1B and 2B, discussed above.

The color sequence for the display system of FIG. 27 is produced by rotating the wheel 3 that has the color filter segments. This results in frame sequential color operation, as previously described. If spatial color mixing is desired for the FIG. 27 display system, the color wheel 3 is removed and the display is provided with individual picture elements that each contain three color dots. This can be accomplished either by providing a mosaic color filter or by utilizing the illuminator shown in FIGS. 17–19.

Figure 29:
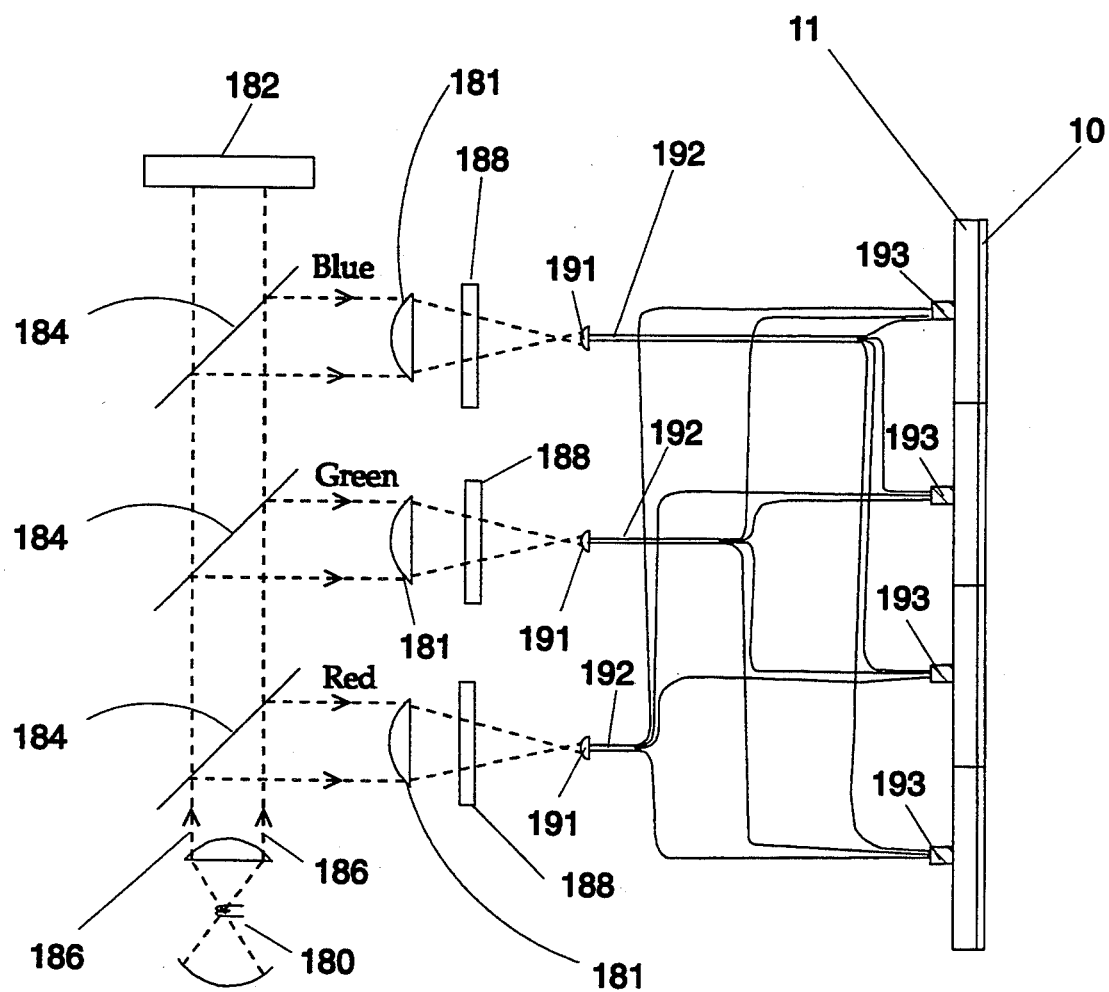
FIG. 29 is a schematic representation of a color flat-panel display system of the present invention that includes a thin fiber-optic illuminator and utilizes dichroic filters and optical shutters as part of a frame sequential color mixing arrangement.

An alternate design for the frame sequential color scheme is shown in FIG. 29. The white light from source 180 is separated into three elemental colors (blue, green, red) and unwanted infrared radiation. The unwanted radiation is absorbed by heat sink 182. The separation of colors is achieved by dichroic filters 184 positioned in the light path 186. Each resulting colored light beam (red, green and blue) is fed through a lens 181 through shutter 188 and is then coupled to the flat illuminator 11 through coupling optics 191, fibers 192 and coupling optics 193. The illuminator 11 provides collimated light as previously described to the microprojection display modules 10.

Each of the elemental colors (red, blue and green) is switched "on" or "off" in the FIG. 29 system by its respective shutter 188, so that only images of a single color are displayed at any instant of time on the display surface. However, these blue, green and red images follow each other so quickly that the human eye is not able to see them as separate images. Rather, the eye integrates these separate images into one image, creating the illusion of full color picture. The shutters 188 have a high throughput and high switching speed. Examples of shutters that may be used include a garnet crystal or a liquid crystal shutter.

My invention is defined by the following claims.

I claim:

1. A flat-panel display system comprising:
   a source of collimated light; and
   a substantially flat-panel positioned in front of the light source and having an array of standard or reversed Schlieren microprojection means, wherein each one of the microprojection means corresponds to a respective picture element of the display.

2. The display system of claim 1, wherein the microprojection means is a reversed Schlieren microprojector.

3. The display system of claim 2, wherein the substantially flat panel having the array of reversed Schlieren microprojectors comprises:
   a substrate transparent to at least one wavelength of the light;
   a scattering medium positioned in front of a front surface of the substrate, the scattering medium having a plurality of defined portions, each defined portion corresponding to and forming part of a particular microprojector of the display system wherein each defined portion of the scattering medium, when in a first state, scatters any incident light, and when in a second state, transmits any incident light substantially unaltered;
   means for switching each defined portion of the scattering medium from the first state to the second state and from the second state to the first state; and
   an array of optical blocking means positioned forward of the scattering layer, each optical blocking means corresponding to and forming part of a particular microprojector and having a first opening whereby when the corresponding defined portion of the scattering medium is in the first state, almost all of the light scattered by the corresponding defined portion is blocked by the optical blocking means and, when the defined portion of the scattering medium is in the second state, almost all of the light transmitted by the scattering medium passes through the first opening toward a viewer.

4. The display system of claim 3, wherein the scattering medium comprises:
   a fluid medium containing in suspension microscopic particles responsive to an applied electric field such that, when a particular defined portion is in a first state, incident light is scattered and, when in a second state, incident light is transmitted substantially unaltered.

5. The display system of claim 3 further comprising:
   means for variably controlling the amount of scattering by each of the defined portions of the scattering medium to provide a gray scale.

6. The display system of claim 3, wherein each optical blocking means comprises an opaque aperture plate defined by four side walls and a front wall, and a first opening being centrally located in the front wall.

7. The display system of claim 6 further comprising:
   an array of microlenses positioned forward of the scattering layer and behind the aperture plates of the optical blocking means wherein each of the first openings of the array of optical blocking means is located approximately at the focal point of a corresponding one of the array of microlenses.

8. The display system of claim 6 further comprising:
   an array of active matrix components on a front surface of the substrate wherein the defined portions of the scattering medium and the active matrix components define the picture elements of the display system.

9. The display system of claim 8 further comprising:

means for aligning an individual picture element of the display with the first opening in the optical blocking means.

10. The display system of claim 8, wherein the array of active matrix components comprises:
   a plurality of data buses on the substrate;
   a plurality of gate buses on the substrate;
   a plurality of thin film transistors, wherein a gate of each transistor is electrically connected to the respective gate bus and a source of each transistor is electrically connected to the respective data bus; and
   an array of electrodes placed in contact with the scattering medium, each electrode corresponding to a particular defined portion of the scattering medium and being electrically charged through the drain of the respective thin film transistor.

11. The display system of claim 3 further comprising:
   a cover transparent to at least one wavelength of the light, the cover being positioned forward of the scattering medium and behind the optical blocking means.

12. The display system of claim 11, wherein the substrate and the cover have the same index of refraction.

13. The display system of claim 11 further comprising:
   means for aligning the aperture plate to the cover, wherein the means for aligning comprises:
   a protrusion extending rearwardly from a back surface of at least one of the side walls of the aperture plate; and
   a dimple in a front surface of the cover aligned with the protrusion.

14. The display system of claim 11 further comprising:
   a faceplate positioned forward of the cover, wherein a back surface and a front surface of the faceplate each have an anti-reflection coating.

15. The display system of claim 3, wherein the scattering medium comprises polymer dispersed liquid crystal material.

16. The display system of claim 15, wherein the liquid crystal material contains a dye.

17. The display system of claim 3, wherein the scattering medium comprises nematic curvilinear aligned phase liquid crystal material.

18. The display system of claim 3 further comprising:
   a rear projection screen positioned forward of the optical blocking means.

19. The display system of claim 3 further comprising:
   an array of microlenses positioned on a back surface of the substrate wherein a corresponding defined portion of the scattering medium is located approximately at the focal point of each corresponding microlens.

20. The display system of claim 3 further comprising:
   a color filter means.

21. The display system of claim 20, wherein the color filter means is positioned forward of the scattering medium.

22. The display system of claim 20, wherein the color filter means is positioned forward of the optical blocking means.

23. The display system of claim 3, wherein the substrate, scattering medium and switching means in combination constitute a display module and wherein the display system further comprises:
   a series of display modules positioned adjacent one another wherein, a unitary structure comprising the array of optical blocking means for all the display modules overlays all of the display modules and wherein each display module displays a portion of an image such that the series of display modules in combination display the entire single image.

24. The flat-panel display system of claim 3, wherein the source of collimated light comprises:
   a point light source;
   mirror means positioned behind the point light source for reflecting light from the light source;
   collection means positioned forward of the light source for collecting the light emanating forward from the light source and the light reflected forward by the mirror means;
   first coupling means for coupling the light from the collection means to first ends of a plurality of optical fibers;
   a plurality of flat fiber-optic illuminators; and
   second coupling means for coupling the light from second ends of the plurality of optical fibers to the plurality of flat fiber-optic illuminators, wherein each one of the flat fiber-optic illuminators is positioned behind a corresponding microprojection means.

25. The display system of claim 1, wherein the microprojection means is a standard Schlieren microprojector.

26. The display system of claim 1 further comprising:
   means for producing frame sequential color operation for the display system.

27. The display system of claim 1 further comprising:
   means for producing spatial color mixing for the display system.

28. The flat-panel display system of claim 1, wherein the source of collimated light is a flat fiber-optic illuminator.

29. A flat panel display system comprising:
   a source of collimated light; and
   a substantially flat-panel positioned in front of the light source and having an array of standard or reversed Schlieren microprojection means, each one of the microprojection means corresponding to a respective picture element of the display, wherein the light sources is a flat fiber-optic illuminator which comprises:
   point light-source means;
   a first optical fiber;
   means for coupling the point light-source means to a first end of the first optical fiber;
   a base transparent to at least one wavelength of the light;
   means for securing a second end of the first optical fiber in the base;
   a first reflection means mounted in the base behind the second end of the first optical fiber wherein the second end of the first optical fiber is positioned at the focal point of the reflection means; and
   means for treating the second end of the first optical fiber whereby light emanating from the second end of the first optical fiber is reflected back to the first reflection means, which in turn reflects the light emanating from the second end of the first optical fiber forward in a collimated fashion.

30. A method for displaying information or images in a flat-panel display system comprising the step of directing collimated light onto a flat panel having an array of individual reversed Schlieren microprojectors; and
wherein each one of the microprojectors corresponds to a respective picture element of the system.

31. A flat-panel display system comprising:
a source of collimated light;
a substrate transparent to at least one wavelength of light;
a scattering medium positioned in front of a front surface of the substrate, the scattering medium having a plurality of defined portions, each defined portion corresponding to a particular picture element of the display system wherein each defined portion of the scattering medium, when in a first state, scatters any incident light, and, when in a second state, transmits any incident light substantially unaltered;
means for switching each defined portion of the scattering medium from the first state to the second state and from the second state to the first state;
a cover positioned in front of the scattering medium, the cover being transparent to at least one wavelength of light, the cover further having an index of refraction that is smaller than the index of refraction of the scattering layer; and
a plurality of standard or reversed Schlieren microprojection means wherein each microprojection means corresponds to a picture element.

32. A modular substantially flat-panel display having an array of reversed Schlieren microprojectors comprising:
an array of partial display modules;
at least one source of collimated light positioned behind the display modules, wherein each one of the modules contains a substrate transparent to at least one wavelength of the light, a scattering medium positioned in front of a front surface of the substrate, the scattering medium having a plurality of defined portions, each defined portion corresponding to and forming part of a particular microprojector of the display wherein each defined portion of the scattering medium, when in a first state, scatters any incident light, and, when in a second state, transmits any incident light substantially unaltered, and means for switching each defined portion of the scattering medium from the first state to the second state and from the second state to the first state;
a single global structure containing an array of optical blocking means positioned forward of the scattering layer of the partial display modules, each optical blocking means corresponding to and forming part of a particular microprojector and having a first opening whereby when the corresponding defined portion of the scattering medium is in the first state, almost all of the light scattered by the corresponding defined portion is blocked by the optical blocking means and, when the defined portion of the scattering medium is in the second state, almost all of the light transmitted by the scattering medium passes through the first opening toward a viewer; and
wherein each one of the microprojectors corresponds to a respective picture element.

33. The display system of claim 32, wherein each scattering medium comprises:
a fluid medium containing in suspension microscopic particles responsive to an applied electric field such that, when a particular defined portion is in a first state, incident light is scattered and, when in a second state, incident light is transmitted substantially unaltered.

34. The display system of claim 32, wherein each optical blocking means comprises an opaque aperture plate defined by four side walls and a front wall, and a first opening being centrally located in the front wall.

35. The display system of claim 34 further comprising:
an array of microlenses positioned forward of the scattering layer and behind the aperture plates of the optical blocking means, wherein each of the first openings of the array of optical blocking means is located approximately at the focal point of a corresponding one of the array of microlenses.

36. The display system of claim 32 further comprising:
a cover transparent to at least one wavelength of the light, the cover being positioned forward of the scattering medium and behind the optical blocking means.

37. The display system of claim 36, wherein the substrate and the cover have the same index of refraction.

38. The display system of claim 32, wherein the scattering medium comprises polymer dispersed liquid crystal material.

39. The display system of claim 32, wherein the scattering medium comprises nematic curvilinear aligned phase liquid crystal material.

40. The display system of claim 32 further comprising:
a rear projection screen positioned forward of the optical blocking means.

41. The display system of claim 32 further comprising:
an array of microlenses positioned on a back surface of the substrate wherein a corresponding defined portion of the scattering medium is located approximately at the focal point of each corresponding microlens.

42. The display system of claim 32 further comprising:
a color filter means.

43. The display system of claim 32 further comprising:
an array of active matrix components on a front surface of the substrate wherein the defined portions of the scattering medium and the active matrix components define the picture elements of the display system, wherein the array of active matrix components comprises: a plurality of data buses on the substrate, a plurality of gate buses on the substrate, a plurality of thin film transistors, wherein a gate of each transistor is electrically connected to the respective gate bus and a source of each transistor is electrically connected to the respective data bus, and an array of electrodes placed in contact with the scattering medium, each electrode corresponding to a particular defined portion of the scattering medium and being electrically charged through the drain of the respective thin film transistor.

* * * * *